(12) United States Patent
Hyoudou et al.

(10) Patent No.: US 10,617,990 B2
(45) Date of Patent: Apr. 14, 2020

(54) AIR-FILTERING MEDIUM, AIR FILTER PACK, AND AIR FILTER UNIT

(71) Applicant: DAIKIN INDUSTRIES, LTD., Osaka-shi, Osaka (JP)

(72) Inventors: Takayuki Hyoudou, Osaka (JP); Tatsumi Sakano, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/338,323

(22) PCT Filed: Sep. 26, 2017

(86) PCT No.: PCT/JP2017/034773
§ 371 (c)(1),
(2) Date: Mar. 29, 2019

(87) PCT Pub. No.: WO2018/062194
PCT Pub. Date: Apr. 5, 2018

(65) Prior Publication Data
US 2019/0336903 A1    Nov. 7, 2019

(30) Foreign Application Priority Data
Sep. 30, 2016    (JP) .................................. 2016-194490

(51) Int. Cl.
*B32B 3/30*    (2006.01)
*B32B 3/28*    (2006.01)
(Continued)

(52) U.S. Cl.
CPC ....... *B01D 46/523* (2013.01); *B01D 46/0005* (2013.01); *B32B 3/28* (2013.01);
(Continued)

(58) Field of Classification Search
CPC .............. B01D 46/523; B01D 46/0005; B01D 2275/10; B32B 5/022; B32B 27/322;
(Continued)

(56) References Cited

U.S. PATENT DOCUMENTS 5,066,400 A * 11/1991 Rocklitz .............. B01D 29/012
                                                        210/493.5
5,888,262 A *  3/1999 Kahler ................. B01D 29/012
                                                        210/493.5
(Continued)

FOREIGN PATENT DOCUMENTS

| JP | 9-507156 A | 7/1997 |
|---|---|---|
| JP | 2010-149055 A | 7/2010 |
| JP | 2013-52321 A | 3/2013 |

OTHER PUBLICATIONS

Extended European Search Report dated Sep. 6, 2019 in corresponding European Application No. 17856144.5.

*Primary Examiner* — Minh Chau T Pham
(74) *Attorney, Agent, or Firm* — Birch, Stewart, Kolasch & Birch, LLP

(57) ABSTRACT

An air-filtering medium, an air filter pack, and an air filter unit, which are capable of reducing the number of portions where filtering functions can no longer be exhibited while suppressing an increase in pressure drop are provided. An air-filtering medium is used in a pleated state and includes a main collecting layer, a downwind-surface interval maintaining structure material, and an upwind-surface interval maintaining member. The main collecting layer includes an upwind-surface embossed protrusion protruding in a thickness direction of the main collecting layer. In the pleated state, the upwind-surface embossed protrusion is provided at least on an upstream side of a center of the air-filtering medium in a direction of airflow passing through the air-filtering medium, and protrudes towards an upwind-surface (Continued)

side. In the pleated state, the downwind-surface interval maintaining structure maintains an interval between facing downwind surfaces at least at a portion on an air-flow downstream side of the center of the air-filtering medium in the direction of airflow. In the pleated state, the upwind-surface interval maintaining member maintains an interval between facing upwind surfaces at least at a portion on the downstream side of the center of the air-filtering medium in the direction of airflow.

23 Claims, 8 Drawing Sheets

(51) Int. Cl.
*B32B 27/12* (2006.01)
*B01D 46/52* (2006.01)
*B01D 46/00* (2006.01)
*B32B 5/02* (2006.01)
*B32B 27/32* (2006.01)

(52) U.S. Cl.
CPC ............... *B32B 3/30* (2013.01); *B32B 5/022* (2013.01); *B32B 27/12* (2013.01); *B32B 27/322* (2013.01); *B01D 2275/10* (2013.01); *B32B 2250/03* (2013.01); *B32B 2307/724* (2013.01)

(58) Field of Classification Search
CPC .. B32B 3/30; B32B 3/28; B32B 27/12; B32B 2250/03; B32B 2307/724
USPC .... 55/381, 486, 497, 521, 524, 527, DIG. 5; 210/493.1, 493.2, 493.5, 503
See application file for complete search history.

(56) References Cited

U.S. PATENT DOCUMENTS

| | | | |
|---|---|---|---|
| 7,625,418 B1* | 12/2009 | Choi | B01D 29/012 55/521 |
| 2005/0139544 A1* | 6/2005 | Choi | B01D 46/0001 210/493.1 |
| 2011/0314782 A1 | 12/2011 | Morita et al. | |
| 2012/0037561 A1* | 2/2012 | Schaeper | B01D 46/2411 210/493.2 |
| 2014/0223872 A1* | 8/2014 | Bao | B01D 39/16 55/486 |
| 2016/0067647 A1* | 3/2016 | Tate | B01D 46/10 95/273 |
| 2016/0236132 A1* | 8/2016 | Hara | B01D 46/523 |
| 2017/0259201 A1* | 9/2017 | Freiler | B01D 46/523 |
| 2018/0236392 A1* | 8/2018 | Murakami | B01D 46/52 |

* cited by examiner

AIR-FILTERING MEDIUM, AIR FILTER PACK, AND AIR FILTER UNIT

TECHNICAL FIELD

The present invention relates to an air-filtering medium, an air filter pack, and an air filter unit.

BACKGROUND ART

Depending upon the collection efficiency with which particles having predetermined particle sizes are collected, air filters are classified as, for example, ULPA (ultra low penetration air) filters, HEPA (high efficiency particulate air) filters, or medium efficiency particulate air filters. These air filters are used in different applications in accordance with the performances thereof.

In order to make the effective area, which is a collection allowing area, as wide as possible, these air filters are sometimes used in a pleated state.

As a structure that maintains the pleats of air filters in this way, for example, the following structure of an air filter described in Patent Literature 1 (Japanese Unexamined Patent Application Publication No. 2013-52321) is proposed. In this structure, concave portions and convex portions are formed by embossing surfaces of an air-filtering medium, the intervals between facing surfaces are maintained by the concave portions and convex portions, and the facing surfaces are maintained in a separated state even during use.

SUMMARY OF THE INVENTION

Technical Problem

In the air filter described in Patent Literature 1 mentioned above, the following example is disclosed. In the example, each surface of the pleated air filter is formed with an inclined form by, at upwind-side surfaces, varying the protrusion heights of embossed protrusions such that the protrusion heights of the embossed protrusions on an upwind side (side of the tops of mountain folds) are higher and the protrusion heights of the embossed protrusions on a downwind side (side of the bottoms of valley folds) are lower, and, similarly, by, at downwind-side surfaces of the air filter, varying the protrusion heights of embossed protrusions such that the protrusion heights of the embossed protrusions on the downwind side (the side of the bottoms of the valley folds) are higher and the protrusion heights of the embossed protrusions on the upwind side (the side of the tops of the mountain folds) are lower.

However, when embossed protrusions having relatively low protrusion heights are to be formed, even if concave portions and convex portions are to be formed during embossing, since, for example, the protrusion heights are absorbed by the film thickness of the air filter (the film thickness of the air filter at portions where the concave portions and the convex portions are to be formed by embossing only become smaller, and the embossed protrusions cannot be formed to sufficient protrusion heights as intended), it has been newly found that it may be difficult to form the embossed protrusions to the intended protrusion heights.

On the other hand, embossed protrusions having relatively high protrusion heights are easily formed to sufficient protrusion heights as intended.

Therefore, facing surfaces of a filtering medium at portions of the upwind-side surfaces near valley bottom portions are brought close to each other by the embossed protrusions protruding towards the downwind side to sufficient protrusion heights at the downwind-side surfaces. However, the embossed protrusions near the valley bottom portions of the upwind-side surfaces may not be formed to sufficient protrusion heights as intended. Therefore, the facing surfaces of the filtering medium at the portions of the upwind-side surfaces near the valley bottom portions may have excessively small separation distances or may come into contact with each other. The portions where the facing surfaces of the filtering medium have excessively small separation distances or come into contact with each other in this way do not allow sufficient processing fluid to pass. Therefore, it becomes difficult to exhibit adequate filtering functions.

On the other hand, when, in order to pleat the air filter, instead of embossing, a separator is provided at each location to maintain intervals, the existence of each separator itself may increase pressure drop as a filtering medium.

The present invention has been made in view of the above-described points. An object of the present invention is to provide an air-filtering medium, an air filter pack, and an air filter unit, which are capable of reducing the number of portions where filtering functions can no longer be exhibited while suppressing an increase in pressure drop.

Solution to Problem

An air-filtering medium according to a first aspect is an air-filtering medium that is used in a pleated state in which a mountain fold and a valley fold are provided, and that comprises a main collecting layer, a downwind-surface interval maintaining structure, and an upwind-surface interval maintaining member. The main collecting layer includes an upwind-surface embossed protrusion protruding in a thickness direction of the main collecting layer. In the pleated state, the upwind-surface embossed protrusion is provided at least on an upstream side of a center of the air-filtering medium in a direction of airflow passing through the air-filtering medium, and protrudes towards an upwind-surface side. In the pleated state, the downwind-surface interval maintaining structure is a structure that maintains an interval between facing downwind surfaces at least at a portion on an air-flow downstream side of the center of the air-filtering medium in the direction of airflow. In the pleated state, the upwind-surface interval maintaining member maintains an interval between facing upwind surfaces at least at a portion on the downstream side of the center of the air-filtering medium in the direction of airflow.

Note that the types of air-filtering medium described above include a filtering medium that is in an unpleated state and a filtering medium that is in a pleated state as long as the filtering medium is used in a pleated state.

In the pleated state, the upwind-surface embossed protrusion is provided at least on the upstream side of the center of the air-filtering medium in the direction of airflow passing through the air-filtering medium; and, in the pleated state, a protrusion protruding towards the upwind-surface side may be further provided on the downstream side of the center of the air-filtering medium in the direction of airflow passing through the air-filtering medium.

Also, in the pleated state, the downwind-surface interval maintaining structure is a structure that maintains the interval between facing downwind surfaces at a portion on the downstream side of the center of the air-filtering medium in the direction of airflow. For example, the downwind-surface interval maintaining structure may be one having an uneven shape of the filtering medium for maintaining the interval between the downwind surfaces, or may be made of a different material (for example, a resin or a metal) that is more rigid than the filtering medium and that is provided for maintaining the interval between the downwind surfaces. Note that, in the pleated state, the downwind-surface interval maintaining structure may be one that is capable of further maintaining the interval between the facing downwind surfaces at a portion on the upstream side of the center of the air-filtering medium in the direction of airflow.

The upwind-surface interval maintaining member is formed from a different member of a different material compared to that of the main collecting layer. In the pleated state, as long as the upwind-surface interval maintaining member is one that maintains the interval between facing upwind surfaces at a portion on the downstream side of the center of the air-filtering medium in the direction of airflow, the upwind-surface interval maintaining member may be provided on upwind-side surfaces of the filtering medium, on downwind-side surfaces of the filtering medium, or within the thickness of the filtering medium. Note that, for example, in the pleated state, the upwind-surface interval maintaining member may be one that is capable of further maintaining the interval between the facing upwind surfaces at a portion on the upstream side of the center of the air-filtering medium in the direction of airflow.

Also by providing the air-filtering medium with the upwind-surface embossed protrusion, in the pleated state, at a portion on the upstream side of the center of the air-filtering medium in the direction of airflow, the interval between upwind surfaces is easily ensured, excessive reduction in the interval between facing surfaces on the upstream side (the side of the top of the mountain fold) or contact between the facing surfaces on the upstream side (the side of the top of the mountain fold) with each other is suppressed, and sufficient passage of a non-processing fluid between each portion on the upstream side (the side of the tops of the mountain fold) is made possible.

By providing the downwind-surface interval maintaining structure, in the pleated state, at a portion on the downstream side of the center of the air-filtering medium in the direction of airflow, the interval between the downwind surfaces is easily ensured, excessive reduction in the interval between the facing surfaces on the downstream side (the side of the bottom of valley fold) or contact between the facing surfaces on the downstream side (the side of the bottom of the valley fold) with each other can be suppressed. Therefore, in the air-filtering medium, occurrence of a case in which passage of a non-processing fluid is made difficult at a portion where the interval between the facing surfaces on the downstream side (the side of the bottom of the valley fold) is made excessively small or at a portion where the facing surfaces on the downstream side (the side of the bottom of the valley fold) contact each other can be suppressed.

Since, of the upwind-side surfaces of the air-filtering medium, facing surfaces at a portion on the downstream side of the center of the air-filtering medium in the direction of airflow are more likely to be pushed towards the upwind-surface side from the downwind-surface side by the downwind-surface interval maintaining structure, the facing surfaces are brought close to each other. Further, when, in the pleated state, at a portion on the downstream side of the center of the air-filtering medium in the direction of airflow, an embossed protrusion protruding towards the upwind-surface side is not formed or it is difficult to form such an embossed protrusion to a sufficient height even if such an embossed protrusion is to be formed, occurrence of a case in which the facing upwind-side surfaces described above are brought close to each other is difficult to suppress.

However, even in such a case, the air-filtering medium is provided with the upwind-surface interval maintaining member. Therefore, in the pleated state, of the upwind-side surfaces of the air-filtering medium, facing surfaces at a portion on the downstream side of the center of the air-filtering medium in the direction of airflow can be inhibited from excessively approaching or contacting each other. Consequently, in the pleated state, of the upwind-side surfaces of the air-filtering medium, even the portion situated on the downstream side are allowed to function adequately. Moreover, in the pleated state, of the upwind-side surfaces of the air-filtering medium, the portion on the upstream side of the center of the air-filtering medium in the direction of airflow is provided with an upwind-surface embossed protrusion to make it possible to maintain the interval. Therefore, on the upstream side in the pleated state, a different material that maintains the interval between the upwind surfaces (a material that increases pressure drop) can be reduced in size or need not be used. Moreover, since the upwind-surface embossed protrusion itself can be made to pass air currents, it is possible to suppress an increase in pressure drop in the air-filtering medium.

Therefore, it is possible to reduce the number of portions where filtering functions can no longer be exhibited while suppressing an increase in pressure drop.

An air-filtering medium according to a second aspect is the air-filtering medium according to the first aspect, in which, in the pleated state, the upwind-surface interval maintaining member is provided only on the downstream side of the center of the air-filtering medium in the direction of airflow.

In this air-filtering medium, in the pleated state, the upwind-surface interval maintaining member is provided only on the downstream side of the center of the air-filtering medium in the direction of airflow. Therefore, since, in the pleated state, the upwind-surface interval maintaining member is not provided on the upstream side of the center of the air-filtering medium in the direction of airflow, pressure drop in the air-filtering medium caused by the existence of the upwind-surface interval maintaining member can be reduced.

An air-filtering medium according to a third aspect is the air-filtering medium according to the first aspect or the second aspect, in which, in the pleated state, the downwind-surface interval maintaining structure and the upwind-surface interval maintaining member are provided at locations where the downwind-surface interval maintaining structure and the upwind-surface interval maintaining member at least partly overlap each other when viewed in a thickness direction in which portions of the air-filtering medium overlap each other.

Here, the expression "in the pleated state, the downwind-surface interval maintaining structure and the upwind-surface interval maintaining member are provided at locations where the downwind-surface interval maintaining structure and the upwind-surface interval maintaining member at least partly overlap each other when viewed in the thickness direction in which portions of the air-filtering medium overlap each other" implies that "the downwind-surface interval maintaining structure and the upwind-surface interval maintaining member are provided at locations where the downwind-surface interval maintaining structure and the upwind-surface interval maintaining member at least partly overlap each other when viewed in a direction perpendicular to the direction of airflow and perpendicular to a mountain-fold line and a valley-fold line".

In the air-filtering medium, in the pleated state, of the upwind-side surfaces of the air-filtering medium, portions on the downstream side of the center of the air-filtering medium in the direction of airflow are brought close to each other by the downwind-surface interval maintaining structure. However, in the pleated state, the upwind-surface interval maintaining member is provided at a location where the upwind-surface interval maintaining member at least partly overlaps the downwind-surface interval maintaining structure when viewed from the thickness direction in which portions of the air-filtering medium overlap each other. Therefore, excessive approach or contact of the upwind-side surfaces can be suppressed by existence of the upwind-surface interval maintaining member, even at, of the upwind-side surfaces of the air-filtering medium, portions where the downwind-surface interval maintaining structure causes the upwind-side surfaces to be brought close to each other with a larger force.

An air-filtering medium according to a fourth aspect is the air-filtering medium according to any one of the first aspect to the third aspect, in which, in the pleated state, a plurality of upwind-surface embossed protrusions are provided such that protrusion heights become lower towards the downstream side.

A plurality of the upwind-surface embossed protrusions may be provided side by side and, in the pleated state, and may be provided such that the protrusion heights become lower one by one towards the downstream side.

When embossed protrusions having low protrusion heights are to be formed, since the protrusion heights are absorbed by changes in the film thickness of the air-filtering medium, it is difficult to form the embossed protrusions to intended protrusion heights.

However, since, in the air-filtering medium, the protrusion heights are reduced towards the downstream side, in particular, it is difficult to form embossed protrusions on the downstream side in the pleated state. Even if, in this way, the embossed protrusions do not have sufficient protrusion heights on the downstream side, since the air-filtering medium is provided with the upwind-surface interval maintaining member on the downstream side in the direction of airflow in the pleated state, excessive approach or contact of the facing surfaces can be suppressed. Consequently, in the pleated state, of the upwind-side surfaces of the air-filtering medium, even portions situated on the downstream side are allowed to function adequately.

An air-filtering medium according to a fifth aspect is the air-filtering medium according to the fourth aspect, in which, in the pleated state, the upwind-surface interval maintaining member is provided only on the downstream side of the upwind-surface embossed protrusion whose protrusion height in the thickness direction is larger than a thickness of the air-filtering medium.

Note that the protrusion height of the upwind-surface embossed protrusion in the thickness direction refer to protrusion height that does not include the thickness of the air-filtering medium.

When embossed protrusion that is smaller than the thickness of the air-filtering medium is to be provided on the upwind surfaces, since the protrusion height is absorbed by changes in the film thickness of the air-filtering medium, it is difficult to form the embossed protrusion to the intended protrusion height.

However, in the pleated state, the air-filtering medium is provided with the upwind-surface interval maintaining member only on the downstream side of the upwind-surface embossed protrusion whose protrusion height is larger than the thickness of the air-filtering medium. Therefore, by providing the upwind-surface interval maintaining member only on the downstream side where it is difficult to form embossed protrusion to the intended protrusion height, it is possible to reduce the size of the upwind-surface interval maintaining member and to suppress an increase in pressure drop in the air-filtering medium caused by the upwind-surface interval maintaining member itself.

An air-filtering medium according to a sixth aspect is the air-filtering medium according to the fifth aspect, in which, in the pleated state, the upwind-surface embossed protrusions are not provided at a location where the upwind-surface interval maintaining member is provided in the direction of airflow.

Since, in the pleated state, the upwind-surface interval maintaining member is capable of maintaining the interval between surfaces at the location where the upwind-surface interval maintaining member is provided in the direction of airflow, it is not necessary to provide upwind-surface embossed protrusion for maintaining the interval between the surfaces. On the contrary, by forming upwind-surface embossed protrusion, the air-filtering medium may be damaged, as a result of which portion that function as the filtering medium may be reduced in number and leakage may occur.

However, in the air-filtering medium, when upwind-surface embossed protrusions are not unnecessarily provided at the location where the upwind-surface interval maintaining member is provided in the direction of airflow in the pleated state, it is possible to suppress damage to the air-filtering medium.

An air-filtering medium according to a seventh aspect is the air-filtering medium according to any one of the first aspect to the sixth aspect, in which, in the pleated state, the upwind-surface embossed protrusion and the upwind-surface interval maintaining member are provided at locations where the upwind-surface embossed protrusion and the upwind-surface interval maintaining member at least partly overlap each other when viewed in the direction of airflow.

Non-processing fluids tend to pass so as to avoid by a greater degree portions where upwind-surface embossed protrusions are provided than portions where upwind-surface embossed protrusions are not provided. Similarly, non-processing fluids tend to pass so as to avoid by a greater degree a portion where an upwind-surface interval maintaining member is provided than a portion where an upwind-surface interval maintaining member is not provided.

However, in the pleated state, the upwind-surface embossed protrusions and the upwind-surface interval maintaining structure are disposed at locations where the upwind-surface embossed protrusion and the upwind-surface interval maintaining member at least partly overlap each other when viewed in the direction of airflow. Therefore, since, when viewed in the direction of airflow in the pleated state, the portions avoided by non-processing fluids that pass can be disposed so as to at least partly overlap each other, it is possible to reduce pressure drop as the air-filtering medium.

An air-filtering medium according to an eighth aspect is the air-filtering medium according to any one of the first aspect to the seventh aspect further including a downwind-surface interval maintaining member. In the pleated state, the downwind-surface interval maintaining structure includes downwind-surface embossed protrusions that are provided at least on the downstream side of the center of the air-filtering medium in the direction of airflow, and that protrude towards a downwind-surface side. In the pleated state, the downwind-surface embossed protrusions are provided such that protrusion heights become lower towards the upstream side. The downwind-surface interval maintaining member that maintains, in the pleated state, an interval between facing downwind surfaces is provided at least at a portion on the upstream side of the center of the air-filtering medium in the direction of airflow.

Note that a plurality of downwind-surface embossed protrusions may be provided side by side and, in the pleated state, and may be provided such that the protrusion heights become lower one by one towards the upstream side.

In the pleated state, the downwind-surface embossed protrusions are provided at least on the downstream side of the center of the air-filtering medium in the direction of airflow passing through the air-filtering medium; and, in the pleated state, a protrusion provided so as to protrude towards the downwind-surface side may be further provided on the upstream side of the center of the air-filtering medium in the direction of airflow passing through the air-filtering medium.

The downwind-surface interval maintaining member may be formed from a different member of a different material compared to that of the main collecting layer. In the pleated state, as long as the downwind-surface interval maintaining member is one that maintains the interval between facing downwind surfaces at a portion on the upstream side of the center of the air-filtering medium in the direction of airflow, the downwind-surface interval maintaining member may be provided on the upwind-side surfaces of the filtering medium, on the downwind-side surfaces of the filtering medium, or within the thickness of the filtering medium. Note that, for example, in the pleated state, the downwind-surface interval maintaining member may be one that is capable of further maintaining the interval between the facing downwind surfaces at a portion on the downstream side of the center of the air-filtering medium in the direction of airflow.

By providing the air-filtering medium with the upwind-surface embossed protrusions, in the pleated state, at portions on the upstream side of the center of the air-filtering medium in the direction of airflow, the intervals between upwind surfaces are easily ensured, excessive reduction in the intervals between facing surfaces on the upstream side (the side of the top of the mountain fold) or contact between the facing surfaces on the upstream side (the side of the top of the mountain fold) with each other are suppressed, and sufficient passage of a non-processing fluid between each portion on the upstream side (the side of the top of the mountain fold) is made possible.

And, in the air-filtering medium, in the pleated state, downwind-surface embossed protrusions are provided on the upstream side (the side of the top of the mountain fold) as with the downstream side (the side of the bottom of the valley fold). Therefore, at portions on the downstream side of the center of the air-filtering medium in the direction of airflow in the pleated state, the intervals between downwind surfaces are easily ensured, excessive reduction in the intervals between facing surfaces on the downstream side (the side of the bottom of the valley fold) or contact between the facing surfaces on the downstream side (the side of the bottom of the valley fold) with each other can be suppressed. Thus, in the air-filtering medium, occurrence of a case in which passage of a non-processing fluid is made difficult at portions where the intervals between the facing surfaces on the downstream side (the side of the bottom of the valley fold) are made excessively small or at the portions where the facing surfaces on the downstream side (the side of the bottom of the valley fold) contact each other can be suppressed. And by realizing the downwind-surface interval maintaining structure by using downwind-surface embossed protrusions instead of by using a different member that substantially does not pass a non-processing fluid, such as a resin, it is possible to reduce pressure drop as the air-filtering medium.

Since, in the pleated state, of the downwind-side surfaces of the air-filtering medium, facing surfaces at portions on the upstream side of the center of the air-filtering medium in the direction of airflow are more likely to be pushed towards the downwind-surface side from the upwind-surface side by the upwind-surface embossed protrusions above, the facing surfaces are brought close to each other. Further, when, in the pleated state, at the portions on the upstream side of the center of the air-filtering medium in the direction of airflow, embossed protrusions protruding towards the downwind-surface side are not formed or it is difficult to form such embossed protrusions to sufficient protrusion heights even if such embossed protrusions are to be formed, occurrence of a case in which the facing downwind-side surfaces described above are brought close to each other is difficult to suppress.

However, even in such a case, the air-filtering medium is provided with the downwind-surface interval maintaining member on the upstream side (the side of the top of the mountain fold) in the pleated state as with the downstream side (the side of the bottom of the valley fold). Therefore, in the pleated state, of the downwind-side surfaces of the air-filtering medium, facing surfaces at portions on the upstream side of the center of the air-filtering medium in the direction of airflow can be inhibited from excessively approaching or contacting each other. Consequently, in the pleated state, of the downwind-side surfaces of the air-filtering medium, even the portions situated on the upstream side are allowed to function adequately. Moreover, in the pleated state, of the downwind-side surfaces of the air-filtering medium, the portions on the downstream side of the center of the air-filtering medium in the direction of airflow are provided with downwind-surface embossed protrusions to make it possible to maintain the intervals. Therefore, on the downstream side in the pleated state, a different material that maintains the intervals between the downwind surfaces (a material that increases pressure drop) can be reduced in size or need not be used. Moreover, since the downwind-surface embossed protrusions, themselves, can be made to pass air currents, it is possible to suppress an increase in pressure drop in the air-filtering medium.

From the above, it is possible to reduce the number of portions where filtering functions can no longer be exhibited while suppressing an increase in pressure drop.

An air-filtering medium according to a ninth aspect is the air-filtering medium according to any one of the first aspect to the eighth aspect, in which, in the pleated state, a length of the air-filtering medium in the direction of airflow is greater than or equal to 100 mm. It is more desirable that the length be greater than or equal to 120 mm.

The length of the air-filtering medium in the direction of airflow of the air-filtering medium in the pleated state is greater than or equal to 100 mm. When the length in the direction of airflow is long, facing upwind-side surfaces tend to be brought too close to each other or to contact each other, in particular, at portions on the downstream side of the center of the air-filtering medium in the direction of airflow in the pleated state. Even if the length of the air-filtering medium is a long length at which the upwind-side surfaces at the portions on the downstream side of the center of the air-filtering medium in the direction of airflow in the pleated state tend to be brought too close to each other or to contact each other in this way, it is possible to reduce the number of portions where filtering functions can no longer be exhibited while suppressing an increase in pressure drop.

An air-filtering medium according to a tenth aspect is the air-filtering medium according to any one of the first aspect to the ninth aspect further including an air-permeable support layer. The air-permeable support layer is laminated to the main collecting layer. A collection efficiency with which the air-permeable support layer collects NaCl having a particle size of 0.3 μm is lower than a collection efficiency with which the main collecting layer collects NaCl having a particle size of 0.3 μm.

Since the air-filtering medium includes an air-permeable support layer having the above-described properties, it is possible to increase the strength of the air filter where the upwind-side embossed protrusions are formed.

An air filter pack according to an eleventh aspect is one in which the air-filtering medium according to any one of the first aspect to the tenth aspect is mountain-folded and valley folded and is pleated.

An air filter unit according to a twelfth aspect includes the air-filtering medium according to any one of the first aspect to the tenth aspect or the air filter pack according to the eleventh aspect, and a frame body. The frame body stores the air-filtering medium or the air filter pack such that each pleat interval of the air-filtering medium is reduced.

The air filter unit makes it possible to improve sealability between the air-filtering medium or the air filter pack and the frame body by causing the air-filtering medium or the air filter pack to be pushed into and stored in the frame body so as to reduce the pleat intervals. Further, the intervals between facing portions of the air-filtering medium or facing portions in the air filter pack are defined by the heights of the embossed protrusions corresponding thereto, so that desired intervals can be realized.

Advantageous Effects of Invention

The air-filtering medium according to the first aspect, the air filter pack according to the eleventh aspect, and the air filter unit according to the thirteenth aspect make it possible to reduce the number of portions where filtering functions can no longer be exhibited while suppressing an increase in pressure drop.

The air-filtering medium according to the second aspect makes it possible to reduce pressure drop in the air-filtering medium caused by the existence of the upwind-surface interval maintaining member.

The air-filtering medium according to the third aspect makes it possible to suppress, by the existence of the upwind-surface interval maintaining member, excessive approach or contact of the upwind-side surfaces, even at, of the upwind-side surfaces of the air-filtering medium, portions where the downwind-surface interval maintaining structure causes the upwind-side surfaces to be brought close to each other with a larger force.

The air-filtering medium according to the fourth aspect makes it possible to even, of the upwind-side surfaces of the air-filtering medium, the portions situated on the downstream side in the pleated state to function adequately.

The air-filtering medium according to the fifth aspect makes it possible to, by providing the upwind-surface interval maintaining member only on the downstream side where it is difficult to form embossed protrusions to the intended protrusion heights, reduce the size of the upwind-surface interval maintaining member and to suppress an increase in pressure drop in the air-filtering medium caused by the upwind-surface interval maintaining member itself.

The air-filtering medium according to the sixth aspect makes it possible to, when upwind-surface embossed protrusions are not unnecessarily provided, suppress damage to the air-filtering medium.

The air-filtering medium according to the seventh aspect makes it possible to reduce pressure drop as the air-filtering medium.

The air-filtering medium according to the eighth aspect makes it possible to reduce the number of portions where filtering functions can no longer be exhibited while suppressing an increase in pressure drop.

The air-filtering medium according to the ninth aspect makes it possible to, even if the length of the air-filtering medium is a long length at which the upwind-side surfaces at the portions on the downstream side of the center of the air-filtering medium in the direction of airflow in the pleated state tend to be brought too close to each other or to contact each other, reduce the number of portions where filtering functions can no longer be exhibited while suppressing an increase in pressure drop.

The air-filtering medium according to the tenth aspect makes it possible to increase the strength of the air filter where the upwind-side embossed protrusions are formed.

DESCRIPTION OF EMBODIMENTS

An air filter unit, an air filter pack, and an air-filtering medium are described in detail below with reference to examples; however, the descriptions thereof do not limit the invention.

(1) Air Filter Unit 1

Figure 1:
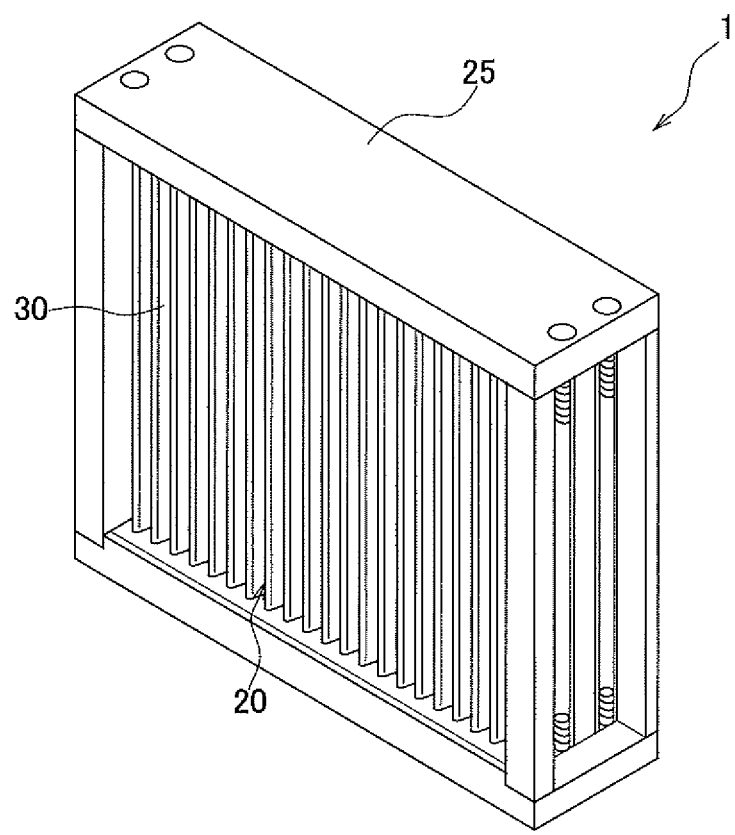
FIG. 1 is an external perspective view of an embodiment of an air filter unit.

FIG. 1 is an external perspective view of an air filter unit 1 according to an embodiment.

The air filter unit 1 includes an air filter pack 20 and a frame body 25 that stores the air filter pack 20.

The frame body 25 is capable of storing and holding the air filter pack 20 therein and may be made of, for example, aluminum, an aluminum alloy, or a resin.

The frame body 25 has large openings on a front side and a rear side in an air-permeation direction and stores the air filter pack 20 (described later) such that the wave shape of the air filter pack 20 appears when viewed in a direction perpendicular to the air-permeation direction. The storage direction of the air filter pack 20 is not limited; however, it is desirable that, in top view, the air filter pack 20 be stored such that the wave shape of the air filter pack 20 appears, that is, the air filter pack 20 be stored in an orientation in which mountain portions and valley portions of pleat shapes extend vertically.

Here, the air filter pack 20 is stored in the frame body 25 such that pleat intervals of each air-filtering medium 30 are reduced. Therefore, a restoring force that increases the pleat intervals of each air-filtering medium 30 can improve sealability at a boundary portion between each air-filtering medium 30 and the frame body 25 and suppress leakage. Note that, although not limited, the air filter pack 20 may be configured to include each air-filtering medium 30 in correspondence with a plurality of folds, in which at a central portion in a direction in which mountain folds and valley folds are arranged side by side, the overlapping filtering media 30 are fixed with, for example, a resin, and at two ends or at one end in the direction in which the mountain folds and the valley folds are arranged side by side, the overlapping parts of the air-filtering media 30 are not fixed with respect to the central portion. Therefore, the sealability with the frame body 25 may be improved by using a restoring force provided by each air-filtering medium 30 that is mountain-folded and valley-folded at the end portions in the direction in which the mountain folds and the valley folds are arranged side by side.

Further, the air filter pack 20 and the frame body 25 may be sealed with a sealing agent. Examples of such a sealing agent include resin materials, such as epoxy-based resin, acrylic-based resin, and urethane-based resin.

(2) Air Filter Pack 20

Figure 2:
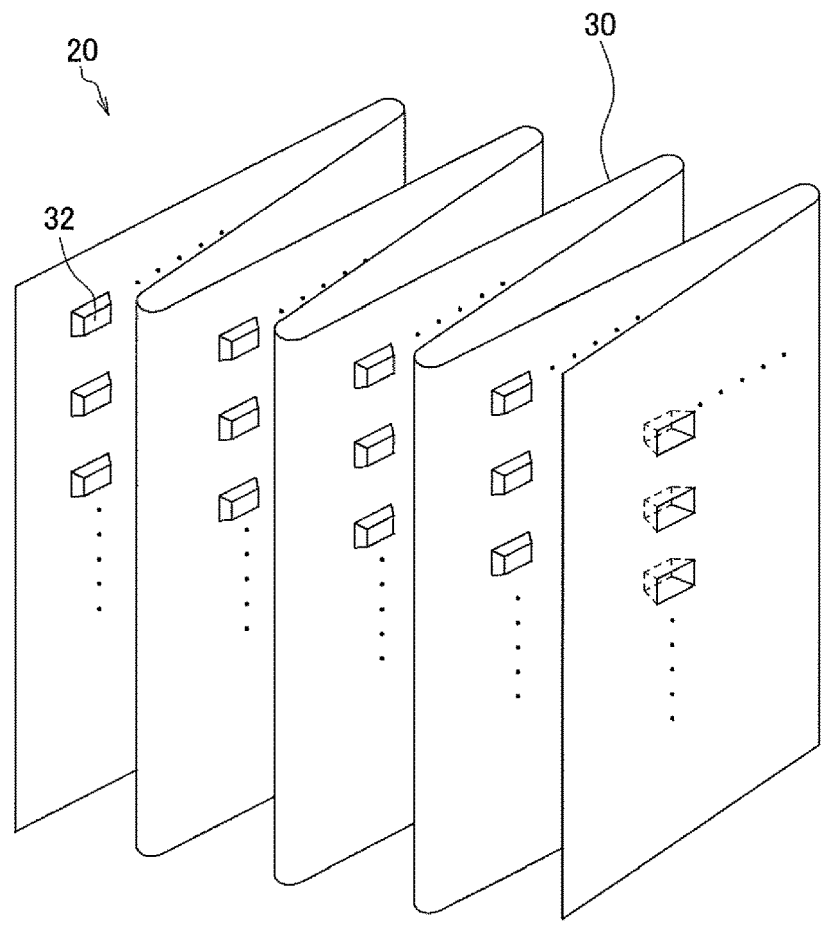
FIG. 2 is an external perspective view of an embodiment of a filter pack.

FIG. 2 is an external perspective view of the air filter pack 20 according to an embodiment.

The air filter pack 20 is formed by repeating the mountain folds and valley folds such that the air-filtering medium 30 has a predetermined shape.

The predetermined shape includes a portion having a folded shape, such as a wave shape (pleat shape) having mountain portions protruding towards one side in a film thickness direction of the air-filtering medium 30 and valley portions recessed towards the other side in the film thickness direction.

The wave shape is maintained by upwind-surface embossed protrusions 32, downwind-surface embossed protrusions 33, upwind-surface interval maintaining members 40, and downwind-surface interval maintaining members 50, which as described below. The distance between adjacent mountain portions of the wave shape and the distance between adjacent valley portions of the wave shape are not limited. By determining the heights of the upwind-surface embossed protrusions 32, the heights of the downwind-surface embossed protrusions 33, the heights of the upwind-surface interval maintaining members 40, and the heights of the downwind-surface interval maintaining members 50 in the film thickness direction, it is possible to maintain the shape at optional distances.

Although not limited, the air filter pack 20 may be obtained by, for example, folding the air-filtering medium 30 by using a reciprocating folding machine or the like.

The folding width of the air filter pack 20 is not limited, and the intervals between the top portions of adjacent mountains are, for example, 25 mm to 280 mm.

From the viewpoint of making it possible to ensure a wide area to pass a non-processing fluid, the length of the air filter pack 20 in a direction of airflow is desirably greater than or equal to 100 mm and is more desirably greater than or equal to 120 mm. In this way, when the length of the air filter pack 20 in the direction of airflow is long, in particular, at portions on a downstream side of the center in the direction of airflow, facing upwind-side surfaces tend to be brought too close to each other or tend to contact each other. However, even in such a case, by providing the upwind-surface interval maintaining members 40, it is possible to prevent excessive approach or contact of the facing upwind-side surfaces and, while suppressing an increase in pressure drop, reduce the number of portions where filtering functions can no longer be exhibited.

(3) Air-Filtering Medium 30

The air-filtering medium 30 includes an air-filter composite film 31 and the upwind-surface interval maintaining members 40 that are sewed to the air filter composite film 31.

Figure 3:
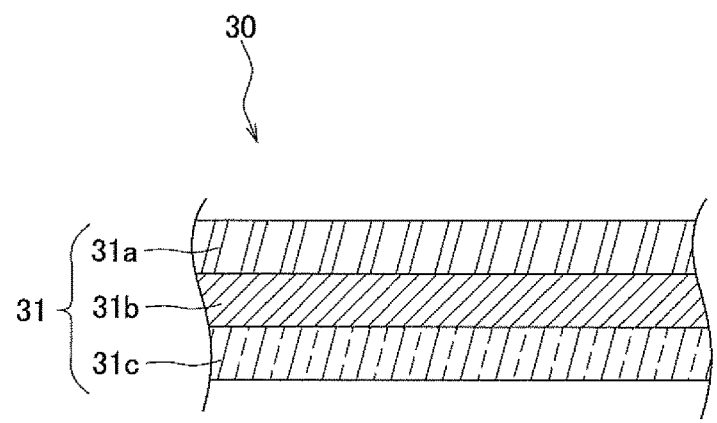
FIG. 3 is a schematic sectional structural view of an air-filter composite film of an embodiment of an air-filtering medium.
Figure 4:
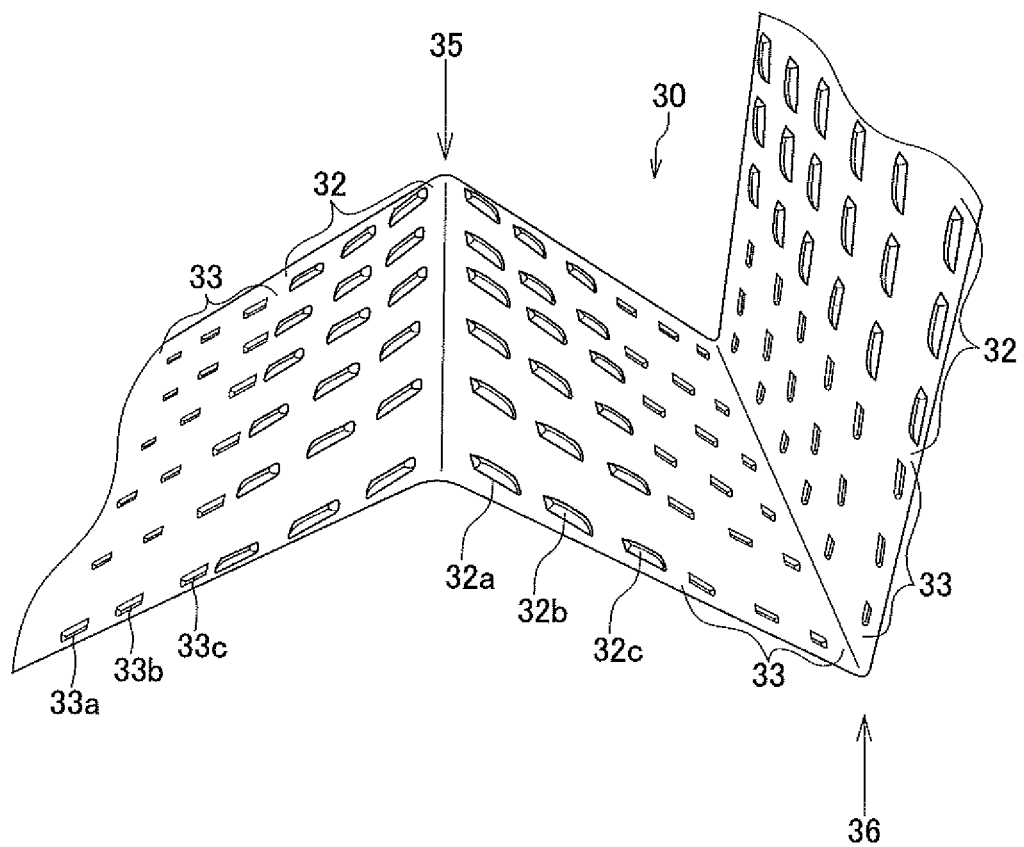
FIG. 4 is a schematic external perspective view of the embodiment of the air-filtering medium (in which upwind-surface interval maintaining members and downwind-surface interval maintaining members are not illustrated).
Figure 5:
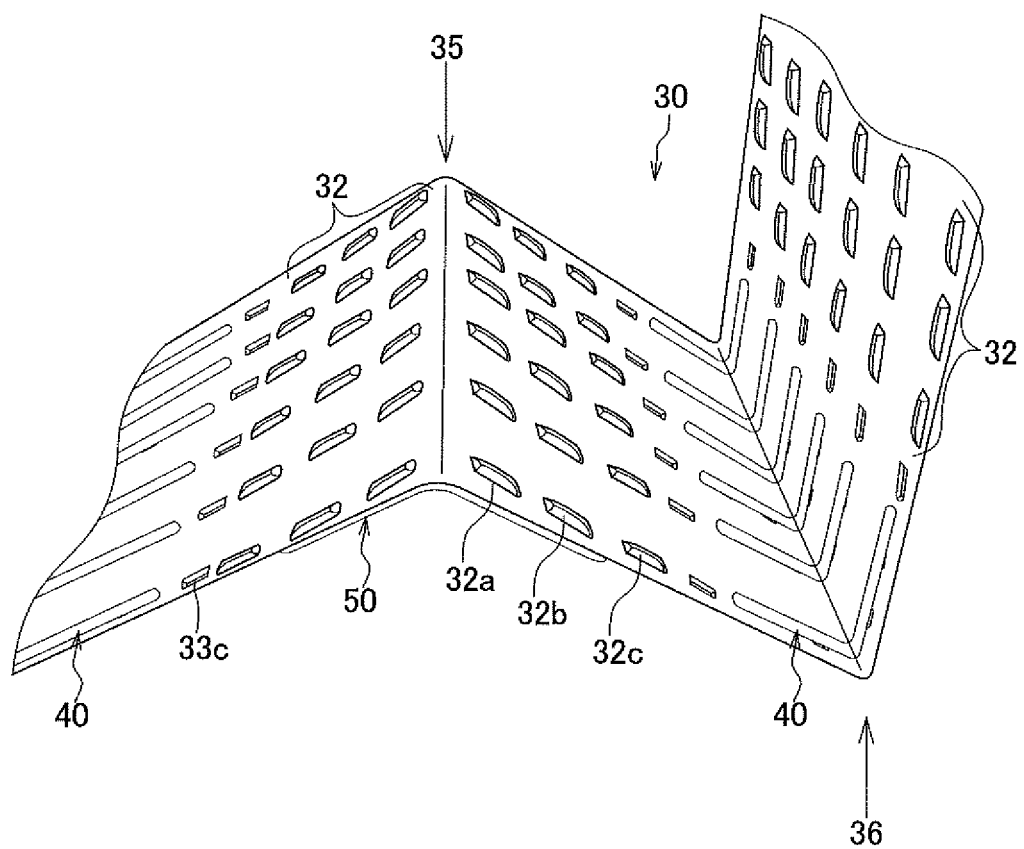
FIG. 5 is a schematic external perspective view of the embodiment of the air-filtering medium.

FIG. 3 is a sectional schematic structural view of the air-filter composite film 31 of the air-filtering medium 30 according to an embodiment. FIG. 4 is a schematic external perspective view of the air-filtering medium 30 according to the embodiment, in which the upwind-surface interval maintaining members 40 and the downwind-surface interval maintaining members 50 are not illustrated. FIG. 5 is a schematic external perspective view of the air-filtering medium 30 according to the embodiment.

By, for example, mountain-folding and valley-folding the air-filtering medium 30 along mountain-fold lines 35 and valley-fold lines 36 shown in FIGS. 4 and 5, the air-filtering medium 30 is pleated, thereby making it possible to form the air filter pack 20.

(3-1) Air-Filter Composite Film 31

The air-filter composite film 31 includes a main collecting layer. Although not limited, for example, as shown in FIG. 3, the air-filter composite film 31 includes, listing from the upstream side, a pre-collecting layer 31*a*, a main collecting layer 31*b*, and an air-permeable maintaining member 31*c* in this order.

When the air-filter composite film 31 includes an air-permeable maintaining member, the air-permeable maintaining member may be provided on a downstream side of the main collecting layer 31*b*, an upstream side of the main collecting layer 31*b*, or on both the upstream side and the downstream side of the main collecting layer 31*b*.

The air-filter composite film 31 need not include the pre-collecting layer 31*a*; however, it is desirable to provide the pre-collecting layer 31*a* from the viewpoint of prolonging the life of the air-filtering medium by reducing dust collection load on the main collecting layer 31*b*. Note that a different functional layer or the aforementioned air-permeable maintaining member may be provided between the pre-collecting layer 31*a* and the main collecting layer 31*b*.

Although not limited, the main collecting layer 31*b* may include, for example, a porous film. The main collecting layer 31*b* may be made of, for example, a fluororesin containing polytetrafluoroethylene as a main component, or a glass fiber; however, from the viewpoint of reducing pressure drop, it is desirable to use a fluororesin. Polytetrafluoroethylene, which is a fluororesin, may or may not be modified. For such a porous film, a single film or a plurality of films that are stacked upon each other may be used. In this case, the plurality of porous films may be of the same film type or of different film types.

It is desirable that pressure drop in the main collecting film 31b, when air is passed through the main collecting film 31b at a flow rate of 5.3 cm/sec, be greater than or equal to 10 Pa and less than 160 Pa. For the main collecting film 31b, it is desirable that the collection efficiency of NaCl having a particle size of 0.3 μm be greater than or equal to 95% and less than or equal to 99.99%. Further, although not limited, the film thickness of the main collecting layer 31b is desirably greater than or equal to 1 μm and less than or equal to 100 μm, and is more desirably greater than or equal to 1 μm and less than or equal to 50 μm. It is desirable that the average fiber diameter when the main collecting layer 31b includes a porous film be less than or equal to 0.1 μm.

Although not limited, a method of manufacturing the main collecting layer 31b is described by using, as an example, the main collecting layer 31b that includes a porous film and that contains polytetrafluoroethylene, which is a fluororesin, as a main component. First, in Step 1, an unbaked or a half-baked film made of, for example, polytetrafluoroethylene is prepared. Then, in Step 2, under a predetermined temperature environment and at a predetermined stretching speed, the unbaked film is stretched in a first direction and then is stretched in a second direction perpendicular to the first direction to form holes and obtain the main collecting layer 31b. Here, the film in Step 1 is obtained, for example, by mixing modified PTFE fine particles and/or homo-PTFE fine particles with an extrusion aid (liquid lubricant), such as liquid paraffin or naphtha, then by rolling with a calender roller or the like a rod-shaped object obtained by paste extrusion, and then by molding the object into a film. Note that a step of removing the extrusion aid (liquid lubricant) may be provided when necessary.

The pre-collecting layer 31a is optional. Although not limited, the pre-collecting layer 31a is one obtained by, for example, a melt-blown method. Examples of materials of the pre-collecting layer 31a include, for example, in addition to polyethylene (PE), polypropylene (PP), polyethylene terephthalate (PET), polybutylene terephthalate (PBT), polyamide (PA), polyacrylonitrile (PAN), polyvinylidene difluoride (PVdF), polyvinyl alcohol (PVA), and polyurethane (PU). The pre-collecting layer 31a may be joined to the main collecting layer 31b by, for example, heat lamination using a hot-melt resin.

It is desirable that pressure drop in the pre-collecting layer 31a, when air is passed through the pre-collecting layer 31a at a flow rate of 5.3 cm/sec, be greater than or equal to 15 Pa and less than 55 Pa. For the pre-collecting film 31a, it is desirable that the collection efficiency of NaCl having a particle size of 0.3 μm be greater than or equal to 25% and less than 80%. Further, the thickness of the pre-collecting layer 31a is desirably less than or equal to 0.4 mm and is more desirably less than or equal to 0.3 mm. The lower limit thereof may be, for example, 0.1 mm.

The air-permeable maintaining member 31c has air permeability and is not limited as long as the air-permeable maintaining member 31c is capable of supporting the main collecting layer 31b; however, the air-permeable maintaining member 31c is desirably a nonwoven fabric. It is desirable that the hole diameter of the air-permeable maintaining member 31c be greater than the hole diameter of the main collecting layer 31b. The air-permeable maintaining member 31c is desirably bonded to the main collecting layer 31b.

Examples of the nonwoven fabric include, for example, a polyethylene terephthalate (PET) fiber nonwoven fabric, a polybutylene terephthalate (PBT) fiber nonwoven fabric, a core-sheath structure nonwoven fabric in which the core component is PET and the sheath component is polyethylene (PE) (PET/PE core/sheath nonwoven fabric), a core-sheath structure nonwoven fabric in which the core component is PET and the sheath component is PBT (PET/PBT core/sheath nonwoven fabric), a core-sheath structure nonwoven fabric in which the core component is PET having a high melting point and the sheath component is PET having a low melting point (high-melting-point PET/low-melting-point PET core/sheath nonwoven fabric), a nonwoven fabric made of composite fibers of a PET fiber and a PBT fiber, and a nonwoven fabric made of composite fibers of a PET fiber having a high melting point and a PET fiber having a low melting point. As the nonwoven fabric, one type or a combination of a plurality of types may be used. Note that it is desirable that the nonwoven fabric have thermal fusibility.

The basis weight of the nonwoven fabric used in the air-permeable maintaining member 31c is not limited and is ordinarily greater than or equal to 10 g/m$^2$ and less than or equal to 600 g/m$^2$, is desirably greater than or equal to 15 g/m$^2$ and less than or equal to 300 g/m$^2$, and is more desirably greater than or equal to 15 g/m$^2$ and less than or equal to 100 g/m$^2$. The film thickness of the nonwoven fabric used in the air-permeable maintaining member 31c is desirably greater than or equal to 0.10 mm and less than or equal to 0.52 mm.

Pressure drop in the air-permeable maintaining member 31c, when air is passed through the air-permeable maintaining member 31c at a flow rate of 5.3 cm/sec, is less than that of the main collecting layer 31b, is desirably less than or equal to 10 Pa, and is more desirably substantially 0. For the air-permeable maintaining member 31c, the collection efficiency of NaCl having a particle size of 0.3 μm is less than that of the main collecting layer 31b, is desirably less than or equal to 5% and is more desirably substantially 0. Further, for example, the thickness of the air-permeable maintaining member 31c is desirably less than or equal to 0.4 mm, is more desirably less than or equal to 0.3 mm, and is even more desirably less than or equal to 0.25 mm. The lower limit thereof may be, for example, 0.1 mm.

The air-permeable maintaining member 31c has the above-described characteristics. Since the flexural rigidity of the air-permeable maintaining member 31c is greater than the flexural rigidity of the main collecting layer 31b, even if the air-permeable maintaining member 31c is embossed as described below, embossed protrusions are easily formed and the strength of the air-filtering medium can be increased.

For example, pressure drop in the entire air-filtering medium 30, when air is passed through the entire filtering medium 30 at a flow rate of 5.3 cm/sec, is less than or equal to 200 Pa and is desirably 60 to 160 Pa. For the entire air-filtering medium 30, the particle collection efficiency, when air containing NaCl particles having a particle size of 0.3 μm is passed through the entire air-filtering medium 30 at a flow rate of 5.3 cm/sec, is desirably greater than or equal to 99.97%.

(3-2) Upwind-Surface Embossed Protrusions 32

With the air-filtering medium 30 being mounted-folded along the mountain-fold lines 35 and being valley-folded along the valley-fold lines 36 (pleated state), the air-filtering medium 30 includes the upwind-surface embossed protrusions 32 that are provided on an upstream side (side of the mountain-fold lines 35) of the center of the filtering medium 30 in a direction of airflow and that protrude towards an upwind-surface side in a thickness direction.

Figure 6:
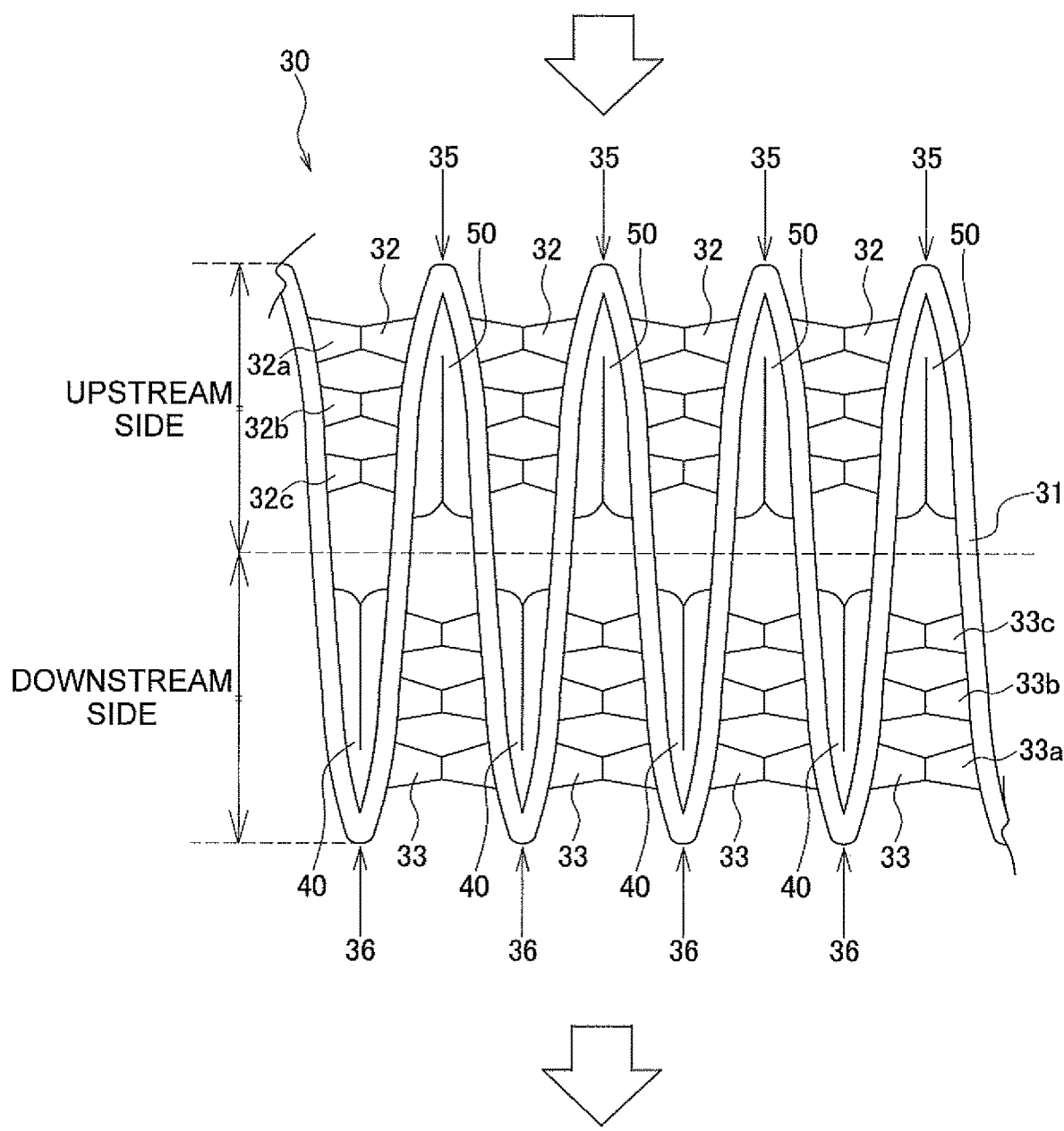
FIG. 6 is a sectional structural view of the embodiment of the pleated air-filtering medium when viewed in a direction of extension of mountain-fold lines and valley-fold lines.

FIG. 6 is a sectional structural view of the air-filtering medium 30 according to the embodiment when viewed in a direction of extension of the mountain-fold lines 35 and the valley-fold lines 36.

In the embodiment, the air-filtering medium 30 has a structure in which the intervals between facing upwind surfaces in the pleated state are determined in terms of contact between the apices of the upwind-surface embossed protrusions 32 protruding from the corresponding upwind surfaces facing each other.

Note that, in plan view of the filtering medium, the protrusion is a portion surrounded by a flat region of a surface of the filtering medium and is a region that protrudes or is recessed from the flat region, and "emboss" means to form such protrusions.

Although not limited, since, when the protrusion heights of the upwind-surface embossed protrusions 32 (the heights excluding the thickness of the air-filter composite film 31) are too low, it becomes difficult to emboss the upwind-surface embossed protrusions 32 to intended protrusion heights, whereas, when the protrusion heights are too high, the air-filter composite film 31 tends to become damaged, the protrusion heights are desirably greater than or equal to 0.5 times and less than or equal to 8.0 times the thickness of the air-filter composite film 31 and are more desirably greater than or equal to 1.0 times and less than or equal to 6.0 times the thickness of the air-filter composite film 31.

Note that, in the present embodiment, in the pleated state, the upwind-surface embossed protrusions 32 are formed from a plurality of protrusions that are provided on the upstream side of the center in the direction of airflow and that protrude towards the upwind-surface side in the thickness direction.

As shown in FIG. 6, in the pleated state, these plurality of protrusions are provided such that the protrusion heights become lower towards the downstream side in the direction of airflow and such that the protrusion heights become higher towards the upstream side in the direction of airflow. Specifically, the protrusion heights of protrusions 32b provided on the upstream side of protrusions 32c are higher than the protrusion heights of the protrusions 32c, and the protrusion heights of protrusions 32a provided on the upstream side of the protrusions 32b are higher than the protrusion heights of the protrusions 32b. Therefore, the air-filtering medium 30 can have an inclined structure in which, in the pleated state, the intervals between facing upwind surfaces of the air-filtering medium 30 become wider towards the upstream side and narrower towards the downstream side.

Note that, when the air-filtering medium 30 has an inclined structure in which the intervals between facing upwind surfaces of the air-filtering medium 30 become wider towards the upstream side and narrower towards the downstream side in this way is used, upwind-surface embossed protrusions having protrusion heights that become lower towards the downstream side are formed; however, since, when upwind-surface embossed protrusions having low protrusion heights are to be formed, the protrusion heights are absorbed by changes in the film thickness of the air-filtering medium 30, it is difficult to form the embossed protrusions to the intended protrusion heights. Accordingly, even if, on the downstream side, formation of embossed protrusions having low protrusion heights is stopped or short embossed protrusions are unintentionally formed, the air-filtering medium 30 is provided with the upwind-surface interval maintaining members 40 described below to make it possible to suppress excessive approach or contact of the facing upwind surfaces.

Note that although not limited, the upwind-surface embossed protrusions 32 are provided by, for example, embossing the entire air-filter composite film 31 by pressing an embossing die against the entire air-filter composite film 31. The upwind-surface interval maintaining members 40 that are formed by embossing in this way are slightly squashed during the embossing; however, they do not lose their function of allowing a non-processing fluid to pass.

(3-3) Downwind-Surface Embossed Protrusions 33

With the air-filtering medium 30 being in the pleated state, the air-filtering medium 30 includes the downwind-surface embossed protrusions 33 that are provided on a downstream side (side of valley-fold lines 36) of the center of the filtering medium 30 in the direction of airflow and that protrude towards a downwind-surface side in the thickness direction.

Note that, in the present embodiment, from the viewpoint of reducing pressure drop, in the pleated state, the height positions of the downwind-surface embossed protrusions 33 are in correspondence with the height positions of the upwind-surface embossed protrusions 32 when viewed in the direction of passage of airflow.

Although not limited, the protrusion heights of the downwind-surface embossed protrusions 33 are set similarly to the protrusion heights of the upwind-surface embossed protrusions 32.

Note that, in the present embodiment, in the pleated state, the downwind-surface embossed protrusions 33 are formed from a plurality of protrusions that are provided on the downstream side of the center in the direction of airflow and that protrude towards the downwind-surface side in the thickness direction.

As shown in FIG. 6, in the pleated state, these plurality of protrusions are provided such that the protrusion heights become lower towards the upstream side in the direction of airflow and such that the protrusion heights become higher towards the downstream side in the direction of airflow. Specifically, the protrusion heights of protrusions 33b provided on the downstream side of protrusions 33c are higher than the protrusion heights of the protrusions 33c, and the protrusion heights of protrusions 33a provided on the downstream side of the protrusions 33b are higher than the protrusion heights of the protrusions 33b. Therefore, the air-filtering medium 30 can have an inclined structure in which, in the pleated state, the intervals between facing downwind surfaces of the air-filtering medium 30 become wider towards the downstream side and narrower towards the upstream side.

Note that, when the air-filtering medium 30 has an inclined structure in which the intervals between facing downwind surfaces of the air-filtering medium 30 become wider towards the downstream side and narrower towards the upstream side in this way is used, downwind-surface embossed protrusions having protrusion heights that become lower towards the upstream side are formed; however, since, when downwind-surface embossed protrusions having low protrusion heights are to be formed, the protrusion heights are absorbed by changes in the film thickness of the air-filtering medium 30, it is difficult to form the embossed protrusions to the intended protrusion heights. Accordingly, even if, on the upstream side, formation of embossed protrusions having low protrusion heights is stopped or short embossed protrusions are unintentionally formed, the air-filtering medium 30 is provided with the downwind-surface interval maintaining members 50 described below to make it possible to suppress excessive approach or contact of the facing downstream surfaces.

Note that although not limited, the downwind-surface embossed protrusions 33 are provided by, for example, embossing the entire air-filter composite film 31 by pressing an embossing die against the entire air-filter composite film 31. The downwind-surface interval maintaining members 50 that are formed by embossing in this way are slightly squashed during the embossing; however, they do not lose their function of allowing a non-processing fluid to pass.

(3-4) Upwind-Surface Interval Maintaining Members 40

The air-filtering medium 30 includes the upwind-surface interval maintaining members 40 on the upwind surfaces on the downstream side (the side of the valley-fold lines 36) of the center in the direction of airflow when the air-filtering medium 30 is in the pleated state.

Since, in the pleated state, the downwind surfaces on the downstream side are provided with the downwind-surface embossed protrusions 33, the facing upwind surfaces on the downstream side in the pleated state tend to be pushed towards the upwind-surface side from the downwind-surface side and, therefore, tend to be brought close to each other. In particular, when, at portions on the downstream side of the center of the air-filtering medium 30 in the direction of airflow in the pleated state, embossed protrusions protruding towards the upwind-surface side are not formed or it is difficult to form such embossed protrusions to sufficient protrusion heights even if such embossed protrusions are to be formed, occurrence of a case in which the facing upwind surfaces tend to be brought close to each other is difficult to suppress. However, in the present embodiment, even in such a case, it is possible to reliably ensure the intervals between the upwind surfaces on the downstream side when the air-filtering medium 30 is pleated by providing the upwind-surface interval maintaining members 40.

The upwind-surface interval maintaining members 40 are formed from a different member of a different material compared to that of the air-filter composite film 31 including the main collecting layer 31b. The materials of the upwind-surface interval maintaining members 40 are not limited as long as they are capable of maintaining the intervals, for example, a synthetic resin, such as a hot melt, a metallic material, a fabric, a felt, or thick paper. The upwind-surface interval maintaining members 40 are not limited and may be, for example, fixed to the air-filter composite film 31 by using an adhesive. Note that although not limited, the thicknesses of the upwind-surface interval maintaining members 40 are desirably greater than or equal to 0.5 times and less than or equal to 10.0 times the thickness of the air-filter composite film 31 and are more desirably greater than or equal to 1.0 times and less than or equal to 6.0 times the thickness of the air-filter composite film 31.

In the pleated state, when viewed in the direction of airflow, the upwind-surface interval maintaining member 40 is provided so as to at least partly overlap the upwind-surface embossed protrusions 32 corresponding thereto, and, in the present embodiment, substantially completely overlaps the upwind-surface embossed protrusions 32 corresponding thereto. Therefore, in the pleated state, when viewed in the direction of airflow, since portions avoided by a non-processing fluid that passes can be disposed so as to overlap each other, it is possible to reduce pressure drop as the air-filtering medium 30.

As shown in FIG. 6, in the air-filtering medium 30, in the pleated state, upwind-surface embossed protrusions 32 are not provided at locations where the upwind-surface interval maintaining members 40 are provided in the direction of airflow. Since, in the pleated state, the upwind-surface interval maintaining members 40 are capable of maintaining the intervals between facing upwind surfaces at the locations where the upwind-surface interval maintaining members 40 are provided in the direction of airflow, it is not necessary to provide upwind-surface embossed protrusions 32 in an overlapping manner for maintaining the intervals between the upwind surfaces. On the contrary, by forming upwind-surface embossed protrusions 32, the air-filter composite film 31 may be damaged, as a result of which portions that function as the filtering medium may be reduced in number and leakage may occur. However, in the present embodiment, when upwind-surface embossed protrusions 32 are not unnecessarily provided at the locations where the upwind-surface interval maintaining members 40 are provided in the direction of airflow in the pleated state, it is possible to suppress damage to the air-filter composite film 31.

Note that, in the present embodiment, in the pleated state, the upwind-surface embossed protrusions 32 and the downwind-surface interval maintaining members 50 are provided at locations where the upwind-surface embossed protrusions 32 and the downwind-surface interval maintaining members 50 at least partly overlap each other when viewed in a direction perpendicular to the direction of airflow and perpendicular to the mountain-fold lines 35 and the valley-fold lines 36. In particular, the upwind-surface embossed protrusion 32 is provided on the back side of the downwind-surface interval maintaining member 50 corresponding thereto. Here, in the air-filtering medium 30, in the pleated state, the downwind surfaces on the upstream side of the center of the air-filtering medium 30 in the direction of airflow are brought close to each other by being pushed towards the downwind-surface side from the upwind-surface side by the upwind-surface embossed protrusions 32. However, the upwind-surface embossed protrusions 32 and the downwind-surface interval maintaining members 50 have the overlapping relationship described above. Therefore, excessive approach or contact of the downwind-side surfaces can be suppressed by the existence of the downwind-surface interval maintaining members 50, even at, of the downwind-side surfaces of the air-filtering medium 30, portions where the upwind-surface embossed protrusions 32 cause the downwind-side surfaces to be brought close to each other with a larger force.

(3-5) Downwind-Surface Interval Maintaining Members 50

The air-filtering medium 30 includes the downwind-surface interval maintaining members 50 on the downwind surfaces on the upstream side (the side of the mountain-fold lines 35) of the center in the direction of airflow when the air-filtering medium 30 is in the pleated state.

Since the upwind surfaces on the upstream side in the pleated state are provided with the upwind-surface embossed protrusions 32, the facing downwind surfaces on the upstream side in the pleated state tend to be pushed towards the downwind-surface side from the upwind-surface side and, therefore, tend to be brought close to each other. In particular, when, at portions on the upstream side of the center of the air-filtering medium 30 in the direction of airflow in the pleated state, embossed protrusions protruding towards the downwind-surface side are not formed or it is difficult to form such embossed protrusions to sufficient protrusion heights even if such embossed protrusions are to be formed, occurrence of a case in which the facing downwind surfaces tend to be brought close to each other is difficult to suppress. However, in the present embodiment, even in such a case, it is possible to reliably ensure the intervals between the downwind surfaces on the upstream side when the air-filtering medium 30 is pleated by providing the downwind-surface interval maintaining members 50.

Similarly to the upwind-surface interval maintaining members 40, the downwind-surface interval maintaining members 50 are formed from a different member of a different material compared to that of the air-filter composite film 31 including the main collecting layer 31b. The materials of the downwind-surface interval maintaining members 50 are not limited as long as they are capable of maintaining the intervals, for example, a synthetic resin, such as a hot melt, a metallic material, a fabric, a felt, or thick paper. Although the downwind-surface interval maintaining members 50 are not limited, they can be, for example, fixed to the air-filter composite film 31 by using an adhesive. Note that although not limited, the thicknesses of the downwind-surface interval maintaining members 50 are desirably greater than or equal to 0.5 times and less than or equal to 10.0 times the thickness of the air-filter composite film 31 and are more desirably greater than or equal to 1.0 times and less than or equal to 6.0 times the thickness of the air-filter composite film 31.

In the pleated state, when viewed in the direction of airflow, the downwind-surface interval maintaining member 50 is provided so as to at least partly overlap the downwind-surface embossed protrusions 33 corresponding thereto, and, in the present embodiment, substantially completely overlaps the downwind-surface embossed protrusions 33 corresponding thereto. Therefore, in the pleated state, when viewed in the direction of airflow, since portions avoided by a non-processing fluid that passes can be disposed so as to overlap each other, it is possible to reduce pressure drop as the air-filtering medium 30.

As shown in FIG. 6, in the air-filtering medium 30, in the pleated state, the downwind-surface embossed protrusions 33 are not provided at locations where the downwind-surface interval maintaining members 50 are provided in the direction of airflow. Since, in the pleated state, the downwind-surface interval maintaining members 50 are capable of maintaining the intervals between downwind surfaces at the locations where the downwind-surface interval maintaining members 50 are provided in the direction of airflow, it is not necessary to provide downwind-surface embossed protrusions 33 in an overlapping manner for maintaining the intervals between the downwind surfaces. On the contrary, by forming downwind-surface embossed protrusions 33, the air-filter composite film 31 may be damaged, as a result of which portions that function as the filtering medium may be reduced in number and leakage may occur. However, in the present embodiment, when downwind-surface embossed protrusions 33 are not unnecessarily provided at the locations where the downwind-surface interval maintaining members 50 are provided in the direction of airflow in the pleated state, it is possible to suppress damage to the air-filter composite film 31.

Note that, in the present embodiment, in the pleated state, the downwind-surface embossed protrusions 33 and the upwind-surface interval maintaining members 40 are provided at locations where the downwind-surface embossed protrusions 33 and the upwind-surface interval maintaining members 40 at least partly overlap each other when viewed in a direction perpendicular to the direction of airflow and perpendicular to the mountain-fold lines 35 and the valley-fold lines 36. In particular, the downwind-surface embossed protrusion 33 is provided on the back side of the upwind-surface interval maintaining member 40 corresponding thereto. Here, in the air-filtering medium 30, in the pleated state, the upwind surfaces on the downstream side of the center of the air-filtering medium 30 in the direction of airflow are brought close to each other by being pushed towards the upwind-surface side from the downwind-surface side by the downwind-surface embossed protrusions 33. However, the downwind-surface embossed protrusions 33 and the upwind-surface interval maintaining members 40 have the overlapping relationship described above. Therefore, excessive approach or contact of the upwind-side surfaces can be suppressed by the existence of the upwind-surface interval maintaining members 40, even at, of the upwind-side surfaces of the air-filtering medium 30, portions where the downwind-surface embossed protrusions 33 cause the upwind-side surfaces to be brought close to each other with a larger force.

(4) Characteristics of the Present Embodiment

In the pleated state, on the upstream side, the air-filtering medium 30 of the present embodiment is provided with the upwind-surface embossed protrusions 32. Therefore, at the portions on the upstream side of the center of the air-filtering medium 30 in the direction of airflow in the pleated state, the intervals between upwind surfaces are easily ensured, and excessive reduction in the intervals between the facing upwind surfaces on the upstream side or contact between the facing upwind surfaces on the upstream side with each other can be suppressed.

Similarly, in the pleated state, on the downstream side, the air-filtering medium 30 is provided with the downwind-surface embossed protrusions 33. Therefore, at the portions on the downstream side of the center of the air-filtering medium 30 in the direction of airflow in the pleated state, the intervals between downwind surfaces are easily ensured, and excessive reduction in the intervals between the facing downwind surfaces on the downstream side or contact between the facing downwind surfaces on the downstream side with each other can be suppressed. Since the intervals between the downwind surfaces on the downstream side can be maintained by the downwind-surface embossed protrusions 33, and different materials, such as resins, that do not pass a non-processing fluid are not used, it is possible to prevent an increase in pressure drop in the air-filtering medium 30.

Note that the upwind-surface embossed protrusions 32 and the downwind-surface embossed protrusions 33 may be formed by squashing a part of the air-filter composite film 31 during embossing; however, even in such a case, since they do not lose their function of allowing a non-processing fluid to pass, it is possible suppress an increase in pressure drop in the air-filtering medium 30 compared to when the intervals are maintained by using, for example, a resin that does not pass a non-processing fluid.

In the air-filtering medium 30 of the present embodiment, since, in the pleated state, the upwind-surface interval maintaining members 40 can be formed with a small size because they are not provided on the upstream side of the center of the air-filtering medium 30 in the direction of airflow, pressure drop in the air-filtering medium 30 caused by the existence of the upwind-surface interval maintaining members 40 can be reduced. Similarly, since, in the pleated state, the downwind-surface interval maintaining members 50 can be formed with a small size because they are not provided on the downstream side of the center of the air-filtering medium 30 in the direction of airflow, pressure drop in the air-filtering medium 30 caused by the existence of the downwind-surface interval maintaining members 50 can be reduced.

(5) Other Embodiments

Although, in the above-described embodiment, an example of an embodiment of the present invention has been described, the embodiment is not to be construed as limiting in any way the invention of the subject application, and the invention of the application is not limited to the above-described embodiment. The invention of the subject application also naturally encompasses modes that have been modified as appropriate within a scope that does not depart from the spirit of the invention.

(5-1) Embodiment A

In the above-described embodiment, the case in which the air filter pack 20 is stored in the frame body 25 such that the pleat intervals of each air-filtering medium 30 are reduced is described as an example.

However, air-filtering media 30 that do not have the form of the air filter pack 20 may be stored in the frame body 25 such that the pleat intervals of the air-filtering media 30 are reduced by mountain-folding and valley-folding the air-filtering media 30. Even in this case, a restoring force that increases the pleat intervals of each air-filtering medium 30 can improve sealability at a boundary portion between each air-filtering medium 30 and the frame body 25 and suppress leakage. In addition, since facing portions of the air-filtering media 30 are subjected to a force by which the frame body 25 reduces the intervals therebetween, the intervals between the facing portions can be reliably defined by the heights of the upwind-surface embossed protrusions 32 corresponding thereto and the heights of the downwind-surface embossed protrusions 33 corresponding thereto, so that desired intervals can be realized.

(5-2) Embodiment B

In the above-described embodiment, the case in which the air-filtering medium has a structure in which the intervals between upwind surfaces that face each other in the pleated state are determined in terms of contact between the apices of the upwind-surface embossed protrusions 32 protruding from the corresponding upwind surfaces facing each other is described as an example.

However, for example, the air-filtering medium may have a structure in which the intervals between upwind surfaces that face each other in the pleated state are determined in such a way that the apex of each upwind-surface embossed protrusion 32 that protrudes from one of the facing upwind surfaces contacts the other facing upwind surface.

(5-3) Embodiment C

In the above-described embodiment, the case in which the upwind-surface embossed protrusions 32 are provided only on the upstream side of the center in the direction of airflow in the pleated state and the downwind-surface embossed protrusions 33 are provided only on the downstream side of the center in the direction of airflow in the pleated state is described as an example.

Figure 7:
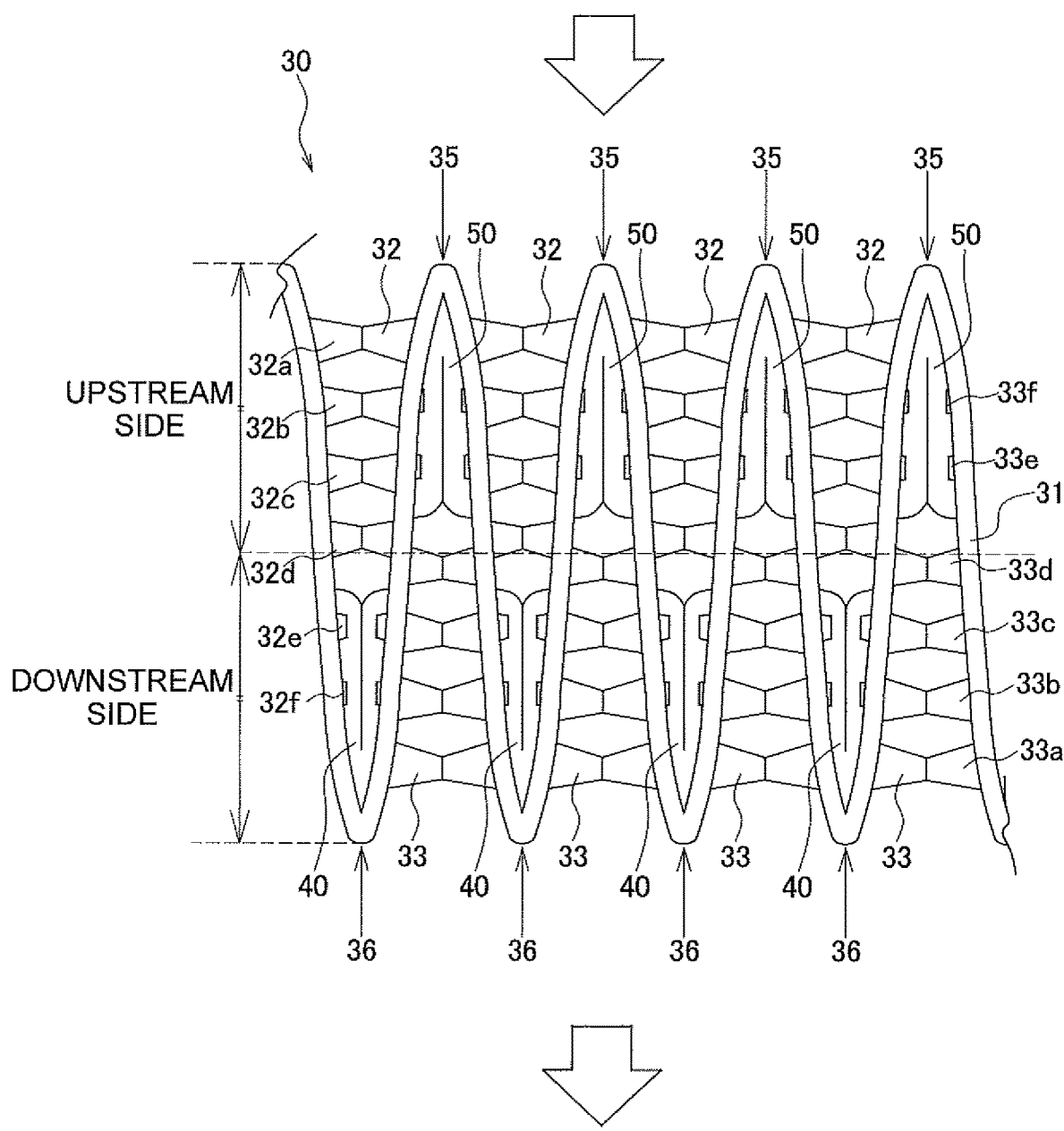
FIG. 7 is a plan view of an air-filtering medium according to an embodiment (C).

However, for example, as shown in FIG. 7, the upwind-surface embossed protrusions 32 may also be provided on the downstream side of the center in the direction of airflow in the pleated state such that their protrusion heights are reduced towards the downstream side (see projections 32*d*, 32*e*, and 32*f*), and the downwind-surface embossed protrusions 33 may also be provided on the upstream side of the center in the direction of airflow in the pleated state such that their protrusion heights are reduced towards the upstream side (see projections 33*d*, 33*e*, and 33*f*).

In this case, at downstream-side portions where the upwind-surface embossed protrusions 32 (see the projections 32*e* and 32*f*) are provided and at the upstream-side portions where the downwind-surface embossed protrusions 33 (see the projections 33*e* and 33*f*) are provided, embossing is absorbed by changes in the film thickness of the air-filtering medium 30, as a result of which there are portions that cannot be formed to intended protrusion heights. However, even in this case, since the upwind surfaces are provided with the upwind-surface interval maintaining members 40 on the downstream side of the center in the direction of airflow in the pleated state, excessive reduction in the intervals between the upwind surfaces or contact between the upwind surfaces can be suppressed. In addition, since the downwind surfaces are provided with the downwind-surface interval maintaining members 50 on the upstream side of the center in the direction of airflow in the pleated state, excessive reduction in the intervals between the downwind surfaces or contact between the downwind surfaces can be suppressed.

Note that, in this case, the downwind-surface interval maintaining members 50 may be provided in the downstream-side portions of the upwind-surface embossed protrusions 32, or may be provided so as to be shifted to locations adjacent to the downstream-side portions of the upwind-surface embossed protrusions 32. Similarly, the upwind-surface interval maintaining members 40 may be provided in the upstream-side portions of the downwind-surface embossed protrusions 33, or may be provided so as to be shifted to locations adjacent to the upstream-side portions of the downstream-surface embossed protrusions 33. FIG. 7 shows, as an example, a case in which the downwind-surface interval maintaining members 50 are provided above the projections 32*e* and 32*f*, which are upwind-surface embossed protrusions 32 on the downstream side, and the upwind-surface interval maintaining members 40 are provided above the projections 33*e* and 33*f*, which are downwind-surface embossed protrusions 33 on the upstream side.

When upwind-surface embossed protrusions 32 are also provided on the downstream side, it is desirable that the upwind-surface interval maintaining members 40 be provided only on the downstream side when viewed from, of the plurality of upwind-surface embossed protrusions 32, those whose protrusion heights (heights excluding the thickness of the air-filter composite film 31) are larger than the thickness of the air-filter composite film 31. When upwind-surface embossed protrusions 32 whose protrusion heights are smaller than the thickness of the air-filter composite film 31 are to be provided, the protrusion heights are absorbed by changes in the film thickness of the air-filter composite film 31, as a result of which it is particularly difficult to form the upwind-surface embossed protrusions 32 to the intended protrusion heights. Therefore, by providing the upwind-surface interval maintaining members 40 only on the downstream side of the upwind-surface embossed protrusions 32 whose protrusion heights are larger than the thickness of the air-filter composite film 31, it is possible to provide the upwind-surface interval maintaining members 40 only at portions where it is difficult to form embossed protrusions to the intended protrusion heights and to reduce the sizes of the upwind-surface interval maintaining members 40. Therefore, it is possible to suppress an increase in pressure drop in the air-filtering medium 30 caused by the upwind-surface interval maintaining members 40 themselves.

When downwind-surface embossed protrusions 33 are also provided on the upstream side, similarly, it is desirable that the downwind-surface interval maintaining members 50 be provided only on the upstream side as viewed from, of the plurality of downwind-surface embossed protrusions 33, those whose protrusion heights (heights excluding the thickness of the air-filter composite film 31) are larger than the thickness of the air-filter composite film 31. When downwind-surface embossed protrusions 33 whose protrusion heights are smaller than the thickness of the air-filter composite film 31 are to be provided, the protrusion heights are absorbed by changes in the film thickness of the air-filter composite film 31, as a result of which it is particularly difficult to form the downwind-surface embossed protrusions 33 to the intended protrusion heights. Therefore, by providing the downwind-surface interval maintaining members 50 only on the upstream side when viewed from the downwind-surface embossed protrusions 33 whose protrusion heights are larger than the thickness of the air-filter composite film 31, it is possible to provide the downwind-surface interval maintaining members 50 only at portions where it is difficult to form embossed protrusions to the intended protrusion heights and to reduce the sizes of the downwind-surface interval maintaining members 50. Therefore, it is possible to suppress an increase in pressure drop in the air-filtering medium 30 caused by the downwind-surface interval maintaining members 50 themselves.

(5-4) Embodiment D

In the above-described embodiment, the case in which the upwind-surface embossed protrusions 32 and the downwind-surface embossed protrusions 33 are provided side by side in the direction of airflow is described as an example.

However, for example, the upwind-surface embossed protrusions 32 and the downwind-surface embossed protrusions 33 may be provided continuously in a consecutive manner in the direction of airflow. In this case, it is desirable that the upwind-surface embossed protrusions 32 be formed such that the protrusion heights are higher towards the upstream side, and the downwind-surface embossed protrusions 33 be formed such that the protrusion heights are higher towards the downstream side.

(5-5) Embodiment E

In the above-described embodiment, the case in which the intervals between the downstream-side surfaces of the air-filtering medium 30 are ensured by the downwind-surface embossed protrusions 33 is described as an example.

Figure 8:
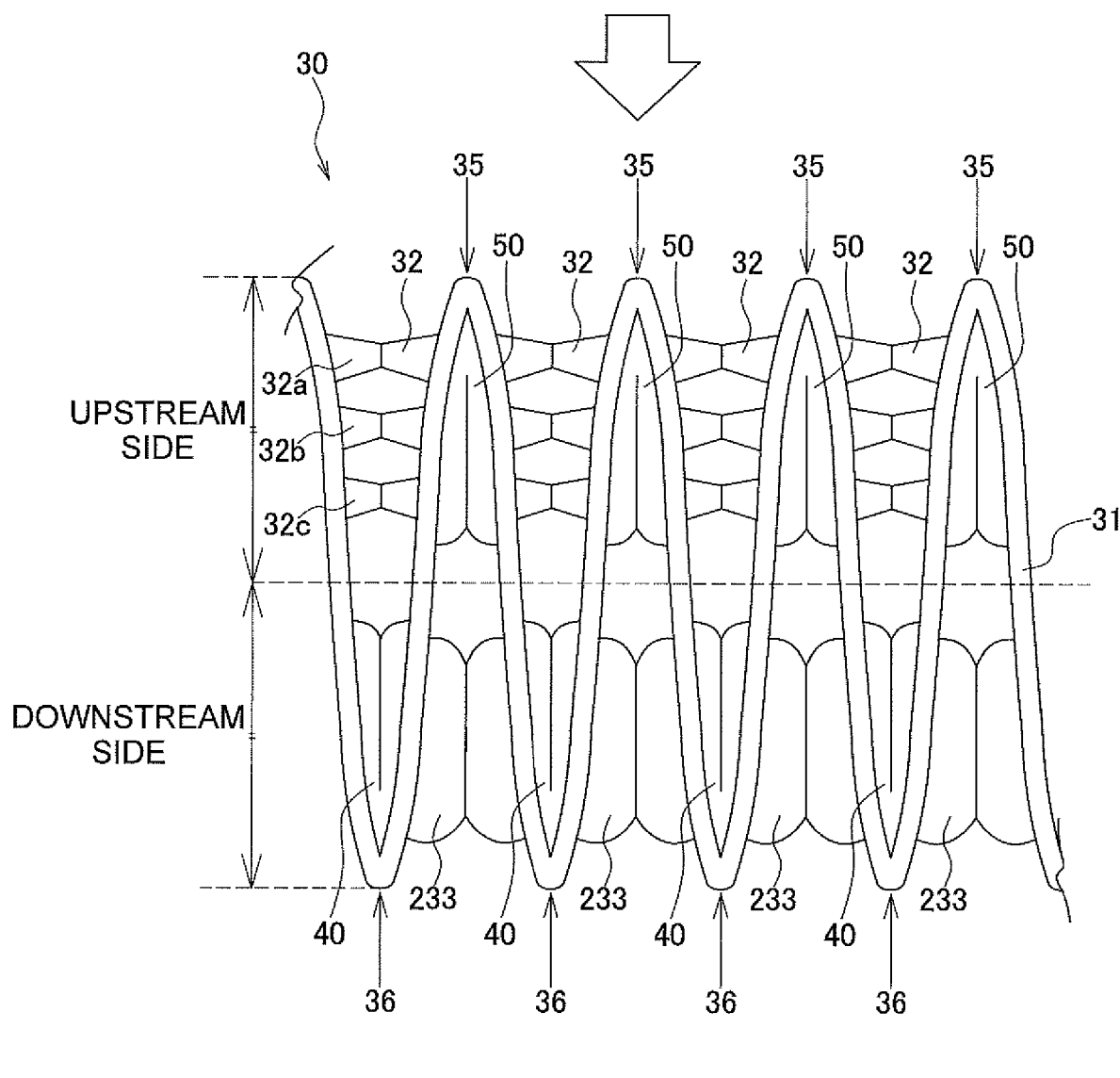
FIG. 8 is a plan view of an air-filtering medium according to an embodiment (E).

However, for example, as shown in FIG. 8, instead of providing the downwind-surface embossed protrusions 33, downwind-surface downstream-side interval maintaining members 233 may be provided.

On the downstream side of the center in the direction of airflow when the air-filtering medium 30 is in the pleated state, the downwind-surface downstream-side interval maintaining members 233 are provided on the downwind-surface side. Note that, similarly to the downwind-surface embossed protrusions 33, the downwind-surface downstream-side interval maintaining members 233 may be separately provided in a plurality in the direction of airflow. The downwind-surface downstream-side interval maintaining members 233 are provided such that, in the pleated state, the heights thereof become lower towards the upstream side and the heights thereof become higher towards the downstream side in the direction of airflow. Therefore, similarly to the above-described embodiment, the air-filtering medium 30 may have an inclined structure in which, in the pleated state, the intervals between facing downwind surfaces of the air-filtering medium 30 become wider towards the downstream side and narrower towards the upstream side.

(5-6) Embodiment F

In the above-described embodiment, the case in which the upwind-surface interval maintaining members 40 are provided on the upwind side of the air-filter composite film 31 and the downwind-surface interval maintaining members 50 are provided on the downwind side of the air-filter composite film 31 is described as an example.

However, since the upwind-surface interval maintaining members 40 are formed to be capable of maintaining the intervals between upwind surfaces on the downstream side in the pleated state, the upwind-surface interval maintaining members 40 are not limited to those that maintain the intervals by contact by the valley folds. For example, the upwind-surface interval maintaining members 40 may each be formed by fixing a V-shaped metal wire or the like along the downwind surfaces on the downstream side in the pleated state, the metal wire or the like producing a force in a direction in which the valley folds are restored. This point similarly applies to the downwind-surface interval maintaining members 50.

EXAMPLES

The present invention is described in detail below by providing examples.

Example 1

66.5 wt % (polymer conversion) of a PTFE aqueous dispersion having an SSG of 2.160 (PTFE-A), 28.5 wt % (polymer conversion) of a low-molecular weight PTFE aqueous dispersion having a melt viscosity, measured at 380° C. by using a flow tester method, of 20,000 Pa·s (PTFE-B), and 5 wt % (polymer conversion) of an FEP aqueous dispersion having a melting point of 215° C. were mixed, 500 ml of a 1% aluminum nitrate aqueous solution was added as a coagulant, and co-coagulation was carried out by stirring. The powder which was thus prepared was drained with a sieve, and then further dried in a hot air drying oven at 135° C. for 18 hours, to obtain a mixed powder of the aforementioned three components.

Next, a hydrocarbon oil (IP SOLVENT 2028 made by Idemitsu Kosan Co. Ltd.) was added, as an extrusion liquid lubricant, in an amount of 25 weight parts to 100 weight parts of the mixture and mixed at 20° C. Next, the mixture obtained thereby was extruded using a paste extruder, to obtain a sheet-shaped molded body. To an end of the paste extruder was attached a sheet die having a rectangular extrusion opening that was 2 mm in length at the short sides×150 mm in length at the long sides. This sheet-shaped molded body was molded into a film form by calender rolls heated to 70° C., thereby obtaining a fluororesin-based film. This film was passed through a 250° C. hot air drying oven to evaporate and remove the hydrocarbon oil and obtain an unbaked fluororesin-based film in the form of a strip having an average thickness of 200 μm and an average width of 150 mm. Next, the unbaked fluororesin-based film was stretched in the longitudinal direction at a stretching ratio of 5 and a stretching speed of 38%/sec. The stretching temperature was 300° C. Next, using a tenter capable of continuously clipping the stretched unbaked film, the film was stretched at a stretching ratio of 13.5 and a stretching speed of 330%/sec in the widthwise direction, and heat setting was carried out. At this time, the stretching temperature was 290° C. and the heat setting temperature was 390° C. A main collecting layer as a porous film (filling rate: 4.2%, average fiber diameter: 0.150 μm, thickness: 38.6 μm) was obtained thereby. Note that the collection efficiency of the main collecting layer was 99.996% and the pressure drop was 135 Pa.

As the pre-collecting layer, a melt-blown nonwoven fabric (basis weight: 30 g/m$^2$, thickness: 0.25 mm) composed of PP, being a fiber having an average fiber diameter of 1.6 μm, was used.

As the air-permeable maintaining member, a thermally bonded nonwoven fabric (average fiber diameter: 28 μm, basis weight: 70 g/m$^2$, thickness: 0.32 mm) obtained by passing a polyester fiber between heated rollers and subjecting them to thermocompression bonding.

As the porous film, the main collecting layer was placed between the pre-collecting layer and the air-permeable maintaining member and was bonded by thermal fusion by using a lamination apparatus.

A filtering medium in which these were joined had a thickness of 0.6 mm, a pressure drop of 162 Pa, and a collecting efficiency of 99.997%.

Figure 9:
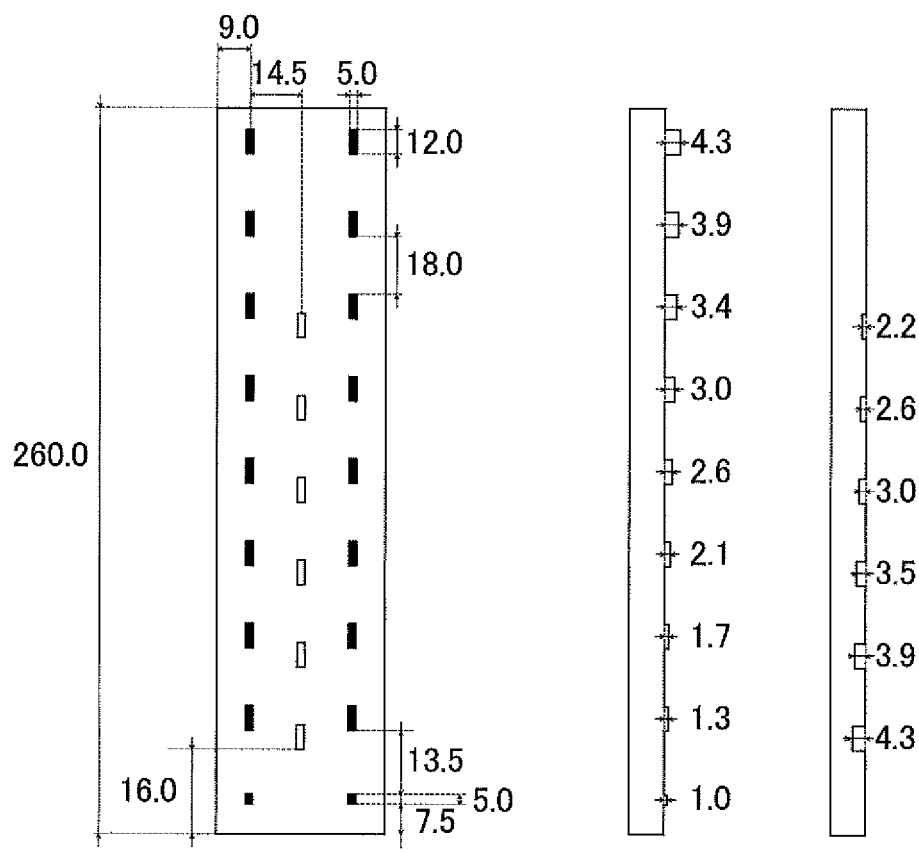
FIG. 9 illustrates an emboss pattern.

In an embossing process, dot-shaped convex portions and dot-shaped concave portions were formed. Here, an emboss pattern in an embossing die is shown in FIG. 9. The illustration on the left in FIG. 9 is a plan view, and the two illustrations on the right in FIG. 9 are sectional views. The black dots in the illustration on the left indicate convex patterns that are to protrude towards the downwind-surface side, and the white dots indicate concave patterns that are to protrude towards the upwind-surface side. The dot-shaped convex portions had the shape of a truncated square pyramid. Nine dot-shaped convex portions were formed in a column in an MD direction (longitudinal direction) of the filtering medium, and the heights of these nine dot-shaped convex portions were 4.3 mm, 3.9 mm, 3.4 mm, 3.0 mm, 2.6 mm, 2.1 mm, 1.7 mm, 1.3 mm, and 1.0 mm in this order from a side where a downstream-side end portion was to be formed. Six dot-shaped concave portions were formed in a column in the MD direction (longitudinal direction) of the filtering medium so as to be positioned between columns of convex patterns, and the depths of these six dot-shaped concave portions were 4.3 mm, 3.9 mm, 3.5 mm, 3.0 mm, 2.6 mm, and 2.2 mm in this order from a side where an upstream-side end portion was to be formed. In one column in a CD direction (widthwise direction), on one surface, a concave-and-convex pattern in which a convex pattern and a concave pattern were alternately disposed at equal intervals to form 20 columns of convex patterns and 19 columns of concave patterns was formed. The lengths of the bottoms of the dot-shaped convex portions and the dot-shaped concave portions were such that the lengths of the bottoms of the dot-shaped convex portions on an end portion on the side where the upstream-side end portion was to be formed were 5 mm and the lengths of the bottoms of the other dot-shaped convex portions and the dot-shaped concave portions were a constant value at 12 mm. The rising angle of each dot-shaped convex portion and the rising angle of each dot-shaped concave portion were 60 degrees. In this way, the dot-shaped convex portions and the dot-shaped concave portions were arranged so as to appear alternately in the CD direction on the front and back surfaces. The filtering medium was placed between a pair of rollers in which dot-shaped convex portions and dot-shaped concave portions having the above-described form were formed, and was sent out from between the rollers in order to be embossed. Specifically, the distance between the upper roller and the lower roller was made equal to the thickness of the filtering medium, and the filtering medium was embossed with the roll temperature being 60° C. and the line speed being 5 m/min.

Upwind-surface interval maintaining members were provided on the back surface of the filtering medium embossed in this way and at locations where the heights of the dot-shaped convex portions were 3.0 mm. Specifically, the upwind-surface interval maintaining members were provided by applying a hot-melt resin (thermoplastic polyamide resin (Macromelt 6202 made by Henkel Corporation) to the filtering medium. The thickness of each upwind-surface interval maintaining member was 1.0 mm.

The filtering medium provided with the upwind-surface interval maintaining members in this way was folded into a zigzag form with a folding width of 260 mm by using a crease pattern attached to the embossing rollers, to form a filter pack.

The filter pack formed in this way was formed into an air filter unit of Example 1 whose outside-diameter size was 610 mm (width)×610 mm (height)×290 mm (depth) by filling a frame, made of an aluminum extrusion material, with a urethane sealing agent.

Comparative Example 1

An air filter unit of Comparative Example 1 was formed in the same way as in Example 1 except that the upwind-surface interval maintaining members in Example 1 were not provided.

TABLE 1

| Interval Maintaining members | | Example 1 Provided | Comparative Example 1 Not Provided |
|---|---|---|---|
| Size of Air Filter Unit (mm) | W | 610 | |
| | L | 610 | |
| | H | 290 | |
| Thickness of Filtering Medium (mm) | | 0.6 | |
| Test Airflow (m$^3$/min) | | 56 | |
| Pressure drop (Pa) | | 210 | 230 |

(Pressure Drop in Air Filter Unit)

The formed air filter unit was set in a rectangular duct, the flow of air was adjusted such that the airflow became 56 m$^3$/min, the pressure was measured on the upstream side and on the downstream side of the air filter unit by using a manometer, and the difference between the pressure on the upstream side and the pressure on the downstream side was obtained as the pressure drop in the air filter unit.

Table 1 above shows that, compared to Comparative Example 1 in which upwind-surface interval maintaining members are not provided, Example 1 in which the upwind-surface interval maintaining members are provided allows the pressure drop to be reduced by 20 Pa.

REFERENCE EXAMPLES

Reference examples are given below, and the difficulty of forming embosses having low protrusion heights during embossing is described in detail.

A filtering medium, in which, as a porous film, a main collecting layer was placed between a pre-collecting layer and an air-permeable maintaining member and was bonded by thermal fusion by using a lamination apparatus was embossed by varying the embossing-die protrusion heights as follows with the embossing roll temperature (die temperature) being 80° C.

In the die used in the embossing, the widths (length in the CD direction) of dot-shaped projections were 3.6 mm, the lengths of the bottoms of the dot-shaped projections were 12 mm, the rising angles of the dot-shaped projections were 60 degrees, and the embossing-die protrusion heights were varied as shown in Table 2 below.

Note that Reference Example 1 (in which the filter-medium thickness was 1 mm), Reference Example 2 (in which the filter-medium thickness was 0.8 mm), and Reference Example 3 (in which the filter-medium thickness was 0.6 mm) were each obtained by using an air-permeable maintaining member having a thickness differing from that in Example 1 above.

TABLE 2

| Embossing-Die Protrusion Height (mm) | Reference Example 1 Filter-Medium Thickness 1 mm Emboss Height (mm) | Reference Example 2 Filter-Medium Thickness 0.8 mm Emboss Height (mm) | Reference Example 3 Filter-Medium Thickness 0.6 mm Emboss Height (mm) |
|---|---|---|---|
| High 4.5 | 2.5 | 2.8 | 2.7 |
| 4.0 | 2.2 | 2.4 | 2.3 |
| 3.5 | 2.2 | 1.9 | 1.9 |
| 3.0 | 1.8 | 1.7 | 1.8 |
| 2.5 | 1.4 | 1.7 | 1.6 |
| 2.0 | 1.1 | 1.4 | 1.4 |
| 1.7 | 0.0 | 0.1 | 0.2 |
| 1.3 | 0.0 | 0.0 | 0.0 |
| Low 1.0 | 0.0 | 0.0 | 0.0 |

Table 2 above shows that when the embossing-die protrusion heights become less than 2.8 times the filter-medium thickness, the emboss heights obtained by the embossing suddenly become low. Note that, when emboss heights that are smaller than the filter-medium thickness are to be obtained, intended emboss heights cannot be obtained.

INDUSTRIAL APPLICABILITY

The air-filtering medium, the air filter pack, and the air filter unit of the present invention can be desirably used in, for example, industrial equipment or facilities, such as semiconductor industrial equipment, a clean room, or a turbine; household appliances, such as an air conditioner, a ventilating fan, or a vacuum cleaner; or air-conditioning facilities of, for example, an office building, a hospital, a pharmaceutical factory, or a food factory.

REFERENCE SIGNS LIST 1 air filter unit
20 filter pack
25 frame body
30 air-filtering medium
31 air-filter composite film
31a pre-collecting layer
31b main collecting layer
31c air-permeable maintaining member
32 upwind-surface embossed protrusion
33 downwind-surface embossed protrusion (downwind-surface interval maintaining structure)
35 mountain-fold line
36 valley-fold line
40 upwind-surface interval maintaining member
50 downwind-surface interval maintaining member
233 downwind-surface downstream-side interval maintaining member (downwind-surface interval maintaining structure)

CITATION LIST

Patent Literature

Japanese Unexamined Patent Application Publication No. 2013-52321

The invention claimed is:

1. An air-filtering medium that is used in a pleated state in which a mountain fold and a valley fold are provided, comprising:
    a main collecting layer that includes an upwind-surface embossed protrusion protruding in a thickness direction of the main collecting layer;
    a downwind-surface interval maintaining structure; and
    an upwind-surface interval maintaining member, wherein
    in the pleated state, the upwind-surface embossed protrusion is provided at least on an upstream side of a center of the air-filtering medium in a direction of airflow passing through the air-filtering medium, and protrudes towards an upwind-surface side,
    in the pleated state, the downwind-surface interval maintaining structure is a structure that maintains an interval between facing downwind surfaces at least at a portion on an air-flow downstream side of the center of the air-filtering medium in the direction of airflow, and
    in the pleated state, the upwind-surface interval maintaining member maintains an interval between facing upwind surfaces at least at a portion on the downstream side of the center of the air-filtering medium in the direction of airflow, and
    in the pleated state, the upwind-surface interval maintaining member is provided only on the downstream side of the center of the air-filtering medium in the direction of airflow.

2. An air-filtering medium that is used in a pleated state in which a mountain fold and a valley fold are provided, comprising:
    a main collecting layer that includes an upwind-surface embossed protrusion protruding in a thickness direction of the main collecting layer;
    a downwind-surface interval maintaining structure; and
    an upwind-surface interval maintaining member, wherein
    in the pleated state, the upwind-surface embossed protrusion is provided at least on an upstream side of a center of the air-filtering medium in a direction of airflow passing through the air-filtering medium, and protrudes towards an upwind-surface side, in the pleated state, the downwind-surface interval maintaining structure is a structure that maintains an interval between facing downwind surfaces at least at a portion on an air-flow downstream side of the center of the air-filtering medium in the direction of airflow, in the pleated state, the upwind-surface interval maintaining member maintains an interval between facing upwind surfaces at least at a portion on the downstream side of the center of the air-filtering medium in the direction of airflow, and in the pleated state, the downwind-surface interval maintaining structure and the upwind-surface interval maintaining member are provided at locations where the downwind-surface interval maintaining structure and the upwind-surface interval maintaining member at least partly overlap each other when viewed in a direction perpendicular to the direction of airflow, perpendicular to a plurality of mountain fold lines and perpendicular to a plurality of valley fold lines.

3. An air-filtering medium that is used in a pleated state in which a mountain fold and a valley fold are provided, comprising:

a main collecting layer that includes upwind-surface embossed protrusions protruding in a thickness direction of the main collecting layer;

a downwind-surface interval maintaining structure; and an upwind-surface interval maintaining member, wherein in the pleated state, the upwind-surface embossed protrusions are provided at least on an upstream side of a center of the air-filtering medium in a direction of airflow passing through the air-filtering medium, and protrude towards an upwind-surface side, in the pleated state, the downwind-surface interval maintaining structure is a structure that maintains an interval between facing downwind surfaces at least at a portion on an air-flow downstream side of the center of the air-filtering medium in the direction of airflow, in the pleated state, the upwind-surface interval maintaining member maintains an interval between facing upwind surfaces at least at a portion on the downstream side of the center of the air-filtering medium in the direction of airflow, in the pleated state, the upwind-surface embossed protrusions are provided such that protrusion heights become lower towards the downstream side, and in the pleated state, the upwind-surface interval maintaining member is provided only on the downstream side with respect to the upwind-surface embossed protrusion whose protrusion height in the thickness direction is larger than a thickness of the air-filtering medium.

4. The air-filtering medium according to claim 3, wherein in the pleated state, the upwind-surface embossed protrusions are not provided at a location where the upwind-surface interval maintaining member is provided in the direction of airflow.

5. The air-filtering medium according to claim 1, wherein in the pleated state, the upwind-surface embossed protrusion and the upwind-surface interval maintaining member are provided at locations where the upwind-surface embossed protrusion and the upwind-surface interval maintaining member at least partly overlap each other when viewed in the direction of airflow.

6. The air-filtering medium according to claim 1, wherein in the pleated state, the downwind-surface interval maintaining structure includes downwind-surface embossed protrusions that are provided at least on the downstream side of the center of the air-filtering medium in the direction of airflow, and protrude towards a downwind-surface side, in the pleated state, the downwind-surface embossed protrusions are provided such that protrusion heights become lower towards the upstream side, and the air-filtering medium further comprises a downwind-surface interval maintaining member that maintains, in the pleated state, an interval between facing downwind surfaces at least at a portion on the upstream side of the center of the air-filtering medium in the direction of airflow.

7. The air-filtering medium according to claim 1, wherein in the pleated state, a length of the air-filtering medium in the direction of airflow is greater than or equal to 100 mm.

8. The air-filtering medium according to claim 1, further comprising:

an air-permeable support layer that is laminated to the main collecting layer, a collection efficiency with which the air-permeable support layer collects NaCl having a particle size of 0.3 μm being lower than a collection efficiency with which the main collecting layer collects NaCl having a particle size of 0.3 μm.

9. An air filter pack, wherein the air-filtering medium according to claim 1 is mountain-folded and valley-folded and is pleated.

10. An air filter unit comprising:

the air-filtering medium according to claim 1; and a frame body that stores the air-filtering medium such that each pleat interval of the air-filtering medium is reduced.

11. An air-filtering medium that is used in a pleated state in which a mountain fold and a valley fold are provided, comprising:

a main collecting layer that includes an upwind-surface embossed protrusion protruding in a thickness direction of the main collecting layer;

a downwind-surface interval maintaining structure; and an upwind-surface interval maintaining member, wherein in the pleated state, the upwind-surface embossed protrusion is provided at least on an upstream side of a center of the air-filtering medium in a direction of airflow passing through the air-filtering medium, and protrudes towards an upwind-surface side, in the pleated state, the downwind-surface interval maintaining structure is a structure that maintains an interval between facing downwind surfaces at least at a portion on an air-flow downstream side of the center of the air-filtering medium in the direction of airflow, and in the pleated state, the upwind-surface interval maintaining member contacts each of facing upwind surfaces outside of any upwind-surface embossed protrusion so as to maintain an interval between the facing upwind surfaces at least at a portion on the downstream side of the center of the air-filtering medium in the direction of airflow.

12. An air filter unit comprising:

the air filter pack according to claim 9; and a frame body that stores the air filter pack such that each pleat interval of the air-filtering medium is reduced.

13. The air-filtering medium according to claim 2, wherein in the pleated state, the upwind-surface embossed protrusion and the upwind-surface interval maintaining member are provided at locations where the upwind-surface embossed protrusion and the upwind-surface interval maintaining member at least partly overlap each other when viewed in the direction of airflow.

14. The air-filtering medium according to claim 3, wherein
in the pleated state, the upwind-surface embossed protrusion and the upwind-surface interval maintaining member are provided at locations where the upwind-surface embossed protrusion and the upwind-surface interval maintaining member at least partly overlap each other when viewed in the direction of airflow.

15. The air-filtering medium according to claim 11, wherein
in the pleated state, the upwind-surface embossed protrusion and the upwind-surface interval maintaining member are provided at locations where the upwind-surface embossed protrusion and the upwind-surface interval maintaining member at least partly overlap each other when viewed in the direction of airflow.

16. The air-filtering medium according to claim 10, wherein
in the pleated state, the upwind-surface embossed protrusion and the upwind-surface interval maintaining member are provided at locations where the upwind-surface embossed protrusion and the upwind-surface interval maintaining member at least partly overlap each other when viewed in the direction of airflow.

17. The air-filtering medium according to claim 4, wherein
in the pleated state, the upwind-surface embossed protrusion and the upwind-surface interval maintaining member are provided at locations where the upwind-surface embossed protrusion and the upwind-surface interval maintaining member at least partly overlap each other when viewed in the direction of airflow.

18. The air-filtering medium according to claim 2, wherein
in the pleated state, the downwind-surface interval maintaining structure includes downwind-surface embossed protrusions that are provided at least on the downstream side of the center of the air-filtering medium in the direction of airflow, and protrude towards a downwind-surface side,
in the pleated state, the downwind-surface embossed protrusions are provided such that protrusion heights become lower towards the upstream side, and
the air-filtering medium further comprises
a downwind-surface interval maintaining member that maintains, in the pleated state, an interval between facing downwind surfaces at least at a portion on the upstream side of the center of the air-filtering medium in the direction of airflow.

19. The air-filtering medium according to claim 3, wherein
in the pleated state, the downwind-surface interval maintaining structure includes downwind-surface embossed protrusions that are provided at least on the downstream side of the center of the air-filtering medium in the direction of airflow, and protrude towards a downwind-surface side,
in the pleated state, the downwind-surface embossed protrusions are provided such that protrusion heights become lower towards the upstream side, and
the air-filtering medium further comprises
a downwind-surface interval maintaining member that maintains, in the pleated state, an interval between facing downwind surfaces at least at a portion on the upstream side of the center of the air-filtering medium in the direction of airflow.

20. The air-filtering medium according to claim 11, wherein
in the pleated state, the downwind-surface interval maintaining structure includes downwind-surface embossed protrusions that are provided at least on the downstream side of the center of the air-filtering medium in the direction of airflow, and protrude towards a downwind-surface side,
in the pleated state, the downwind-surface embossed protrusions are provided such that protrusion heights become lower towards the upstream side, and
the air-filtering medium further comprises
a downwind-surface interval maintaining member that maintains, in the pleated state, an interval between facing downwind surfaces at least at a portion on the upstream side of the center of the air-filtering medium in the direction of airflow.

21. The air-filtering medium according to claim 1, wherein the upwind-surface interval maintaining member is disposed on the upwind surface of the air-filtering medium.

22. The air-filtering medium according to claim 3, wherein the upwind-surface interval maintaining member is disposed on the upwind surface of the air-filtering medium.

23. The air-filtering medium according to claim 2,
wherein, at the locations where the downwind-surface interval maintaining structure and the upwind-surface interval maintaining member at least partly overlap each other, the downwind-surface interval maintaining structure extends across the interval between the facing downward surfaces and the upwind-surface interval maintaining member extends across the interval between the facing upwind surfaces.

* * * * *